United States Patent
Miyasa et al.

(10) Patent No.: US 11,010,899 B2
(45) Date of Patent: May 18, 2021

(54) IMAGE PROCESSING APPARATUS, CONTROL METHOD OF IMAGE PROCESSING APPARATUS, AND STORAGE MEDIUM

(71) Applicant: CANON KABUSHIKI KAISHA, Tokyo (JP)

(72) Inventors: Kazuhiro Miyasa, Narashino (JP); Kiyohide Satoh, Kawasaki (JP); Ryo Ishikawa, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 341 days.

(21) Appl. No.: 15/914,314

(22) Filed: Mar. 7, 2018

(65) Prior Publication Data

US 2018/0268547 A1    Sep. 20, 2018

(30) Foreign Application Priority Data

Mar. 17, 2017 (JP) .............................. JP2017-053140

(51) Int. Cl.
*G06T 7/00* (2017.01)
*G06T 7/33* (2017.01)
*G06T 3/00* (2006.01)

(52) U.S. Cl.
CPC .......... *G06T 7/0016* (2013.01); *G06T 3/0081* (2013.01); *G06T 7/33* (2017.01);
(Continued)

(58) Field of Classification Search
CPC ................ G06T 7/30–38; G06T 3/0068–0081
See application file for complete search history.

(56) References Cited

U.S. PATENT DOCUMENTS

| 6,792,370 B2 | 9/2004 | Satoh et al. |
| 6,993,450 B2 | 1/2006 | Takemoto et al. |

(Continued)

FOREIGN PATENT DOCUMENTS

| JP | 2014-008414 A | 1/2014 |
| JP | 2016-097014 A | 5/2016 |

OTHER PUBLICATIONS

Xiaolei Huang, et al., "Shape Registration in Implicit Spaces Using Information Theory and Free Form Deformations," IEEE Transactions on Pattern Analysis and Machine Intelligence, vol. 28, No. 8, Aug. 2006, pp. 1303-1318.

(Continued)

*Primary Examiner* — Vincent Rudolph
*Assistant Examiner* — Raphael Schwartz
(74) *Attorney, Agent, or Firm* — Venable LLP

(57) ABSTRACT

An image processing apparatus comprises a corresponding point obtaining unit configured to obtain corresponding points that are feature points of an object associated between a first image and a second image; a first deformation obtaining unit configured to obtain first deformation that is based on the corresponding points; a second deformation obtaining unit configured to obtain second deformation that is performed between the first image and the second image, and in which a degree of coincidence of corresponding points is lower than the first deformation; and a combining unit configured to combine the first deformation and the second deformation, regarding positions in at least one image of the first Image and the second image, based on distances between the corresponding points and the positions.

22 Claims, 8 Drawing Sheets

(52) U.S. Cl.
CPC ...... *G06T 7/97* (2017.01); *G06T 2207/10072* (2013.01); *G06T 2207/30068* (2013.01)

(56) References Cited

U.S. PATENT DOCUMENTS

| | | | |
|---|---|---|---|
| 7,092,109 B2 | 8/2006 | Satoh et al. |
| 7,130,754 B2 | 10/2006 | Satoh et al. |
| 7,446,768 B2 | 11/2008 | Satoh et al. |
| 7,519,218 B2 | 4/2009 | Takemoto et al. |
| 7,848,903 B2 | 12/2010 | Aratani et al. |
| 8,730,234 B2 | 5/2014 | Iizuka et al. |
| 9,311,709 B2 | 4/2016 | Miyasa et al. |
| 9,324,148 B2 | 4/2016 | Ishikawa et al. |
| 9,384,555 B2 | 7/2016 | Razeto et al. |
| 9,767,562 B2 | 9/2017 | Takama et al. |
| 9,808,213 B2 | 11/2017 | Endo et al. |
| 9,909,854 B2 | 3/2018 | Yoshibayashi et al. |
| 10,268,918 B2 | 4/2019 | Otomaru et al. |
| 2014/0003690 A1 | 1/2014 | Razeto et al. |
| 2015/0002547 A1* | 1/2015 | Itai ................ A61B 6/463 345/634 |
| 2015/0254841 A1* | 9/2015 | Fujiwara ........... G06T 7/251 378/62 |
| 2016/0148380 A1 | 5/2016 | Otomaru et al. |
| 2017/0039776 A1 | 2/2017 | Endo et al. |
| 2017/0206670 A1 | 7/2017 | Miyasa et al. |
| 2017/0213343 A1* | 7/2017 | Vaillant ............. G06T 11/60 |
| 2017/0337694 A1 | 11/2017 | Takama et al. |
| 2018/0025501 A1 | 1/2018 | Endo et al. |
| 2018/0025548 A1 | 1/2018 | Endo et al. |

OTHER PUBLICATIONS

Feb. 19, 2021 Japanese Official Action in Japanese Patent Appln. No. 2017-053140.

* cited by examiner

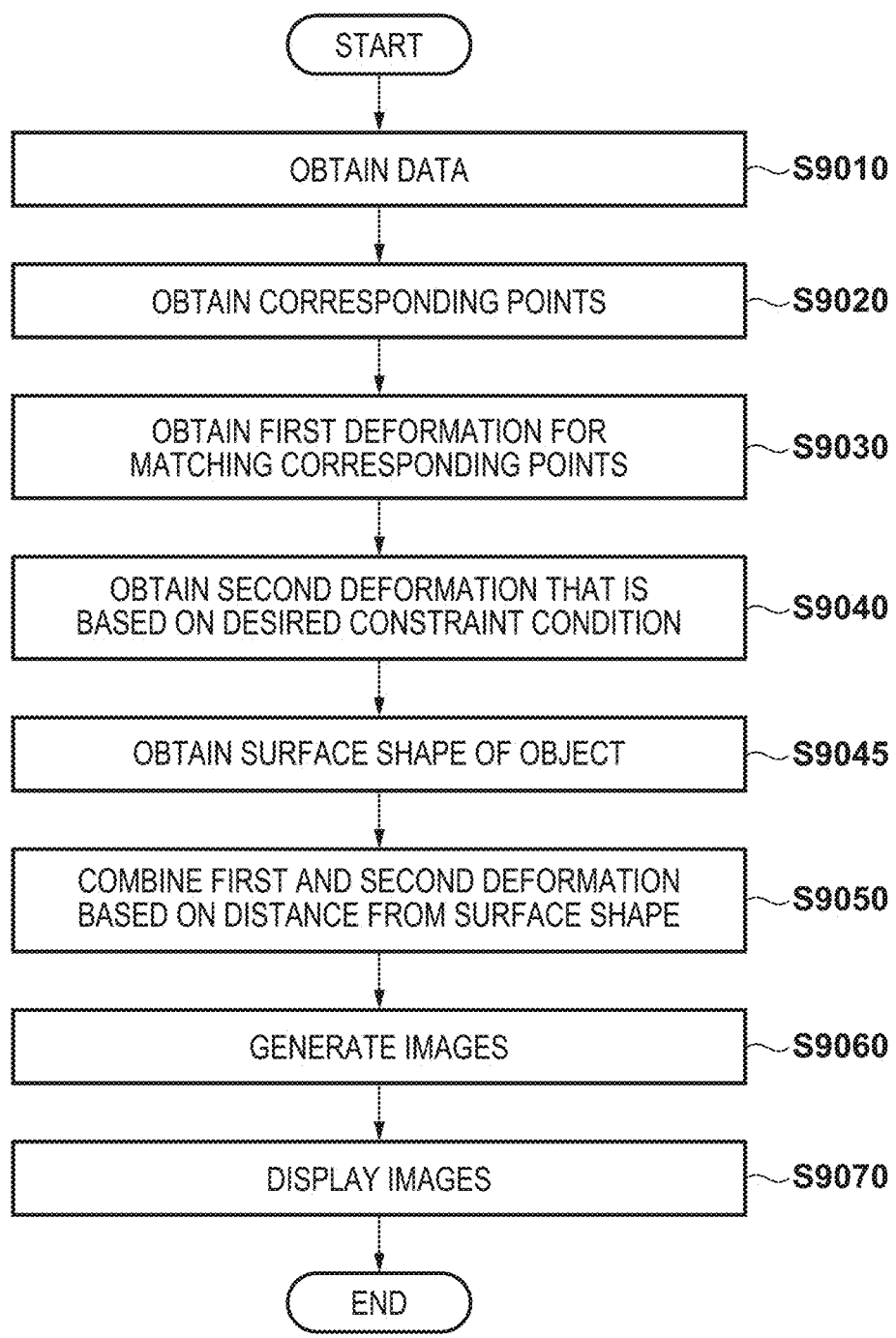

IMAGE PROCESSING APPARATUS, CONTROL METHOD OF IMAGE PROCESSING APPARATUS, AND STORAGE MEDIUM

BACKGROUND OF THE INVENTION

Field of the Invention

The present invention relates to an image processing apparatus, a control method of the image processing apparatus, and a storage medium, and in particular relates to an apparatus that processes three-dimensional images captured with various image capturing apparatuses (modalities) such as a magnetic resonance imaging apparatus (MRI), an X-ray computerized tomography apparatus (X-ray CT), and an Ultrasonography image diagnostic apparatus (US). MRI is an abbreviation of Magnetic Resonance Imaging, CT is an abbreviation of Computed Tomography, and US is an abbreviation of Ultrasonography.

Description of the Related Art

In medical fields, in order to make a diagnosis using medical images captured with a plurality of modalities, or medical images captured at different times, in different postures, and in different shooting modes, it is important to identify (associate) points of interest in the object between the medical images. While some points of interest can be automatically identified by performing image processing, some points of interest are difficult to automatically identify due to influences such as those of different modalities, deformation of the object, and the like. Therefore, normally medical practitioners and the like visually perform an identification operation while viewing the images.

In addition, for the same type of purposes, attempts have been made to register and display a plurality of images, and display a difference image between registered images. At this time, in order to achieve highly accurate registration, often corresponding points visually identified by the user are obtained and used for registration processing.

In Xiaolei Huang, Nikos Paragios, and Dimitris N. Metaxas "Shape Registration in Implicit Spaces Using Information Theory and free Form Deformations", IEEE TRANSACTIONS ON PATTERN ANALYSIS AND MACHINE INTELLIGENCE, VOL, 28, NO.8, AUGUST 2006, not only registration target data hut also pairs of feature points (corresponding points) visually identified by the user are used for registration processing. More specifically, disclosed is a technique for performing registration between anatomical shapes included in medical images or the like by optimising a cost function In which constraint conditions of both the degree of coincidence between the shapes and the degree of coincidence between corresponding points identified by the user are taken into consideration, using a nonlinear optimization technique. At this time, a regularization term for suppressing physically unnatural deformation is generally added to the cost function.

However, in the technique of Xiaolei Huang, Hikes Paragios, and Dimitris N. Metaxas, "Shape Registration in Implicit Spaces Using Information Theory and Free Form Deformations", IEEE TRANSACTIONS ON PATTERN ANALYSIS AMD MACHINE INTELLIGENCE, VOL.28, NO.8, AUGUST 2006, there is an issue that registration accuracy of corresponding point positions is insufficient due to the effect of a constraint condition other than the degree of coincidence of corresponding points.

The present invention has been made in light of the above-described issue, and provides a technique for performing desired registration overall while accurately matching corresponding points between two pieces of image data.

SUMMARY OF THE INVENTION

According to one aspect of the present invention, there is provided an image processing apparatus comprising: a corresponding point obtaining unit configured to obtain corresponding points that are feature points of an object associated between a first image and a second image; a first deformation obtaining unit configured to obtain first deformation that is based on the corresponding points; a second deformation obtaining unit configured to obtain second deformation that is performed between the first image and the second image, and in which a degree of coincidence of corresponding points is lower than the first deformation; and a combining unit configured to combine the first deformation and the second deformation, regarding positions in at least one image of the first image and the second image, based on distances between the corresponding points and the positions.

Further features of the present invention will become apparent from the following description of exemplary embodiments with reference to the attached drawings.

BRIEF DESCRIPTION OF THE DRAWINGS

FIG. 9 is a flowchart showing an overall processing procedure In the fourth embodiment.

DESCRIPTION OF THE EMBODIMENTS

An exemplary embodiment (s) of the present invention will now be described in detail with reference to the drawings. It should be noted that the relative arrangement of the components, the numerical expressions, and numerical values set forth in these embodiments do not limit the scope of the present invention unless it Is specifically stated otherwise.

First Embodiment
Overview

An image processing apparatus according to this embodiment performs deformation registration of a first image and a second image that are three-dimensional images. At this time, first deformation for accurately matching corresponding points associated between the images and second deformation for performing registration that is based on a desired constraint, condition are combined at a ratio that is based on the distance from the corresponding point. More specifically, displacement fields are combined such that the combining ratio of a displacement field of first deformation is higher at positions closer to the corresponding points (in particular, the combining ratio=1.0 on the corresponding points), and the combining ratio of a displacement field of second deformation is higher the longer the distance is from the corresponding points. Accordingly, it is possible to obtain a deformation result that is more affected by first deformation for accurately matching corresponding points, at positions closer to the corresponding points, and is more affected by second deformation for a desired constraint condition, at positions farther away from the corresponding points. Therefore, it is possible to perform desired registration as a whole while accurately matching the corresponding points between the images. Mote that first deformation does not necessarily need to be deformation for matching corresponding points, and it suffices that the first deformation is deformation according to which the degree of coincidence of corresponding points is relatively higher than that of second deformation. In addition, second deformation may be any type of deformation as long as expectation values of the accuracy are higher than those of first deformation as a whole.

Configuration

Configurations and processing of this embodiment will be described below with reference to FIGS. 1 to 6.

Figure 1:
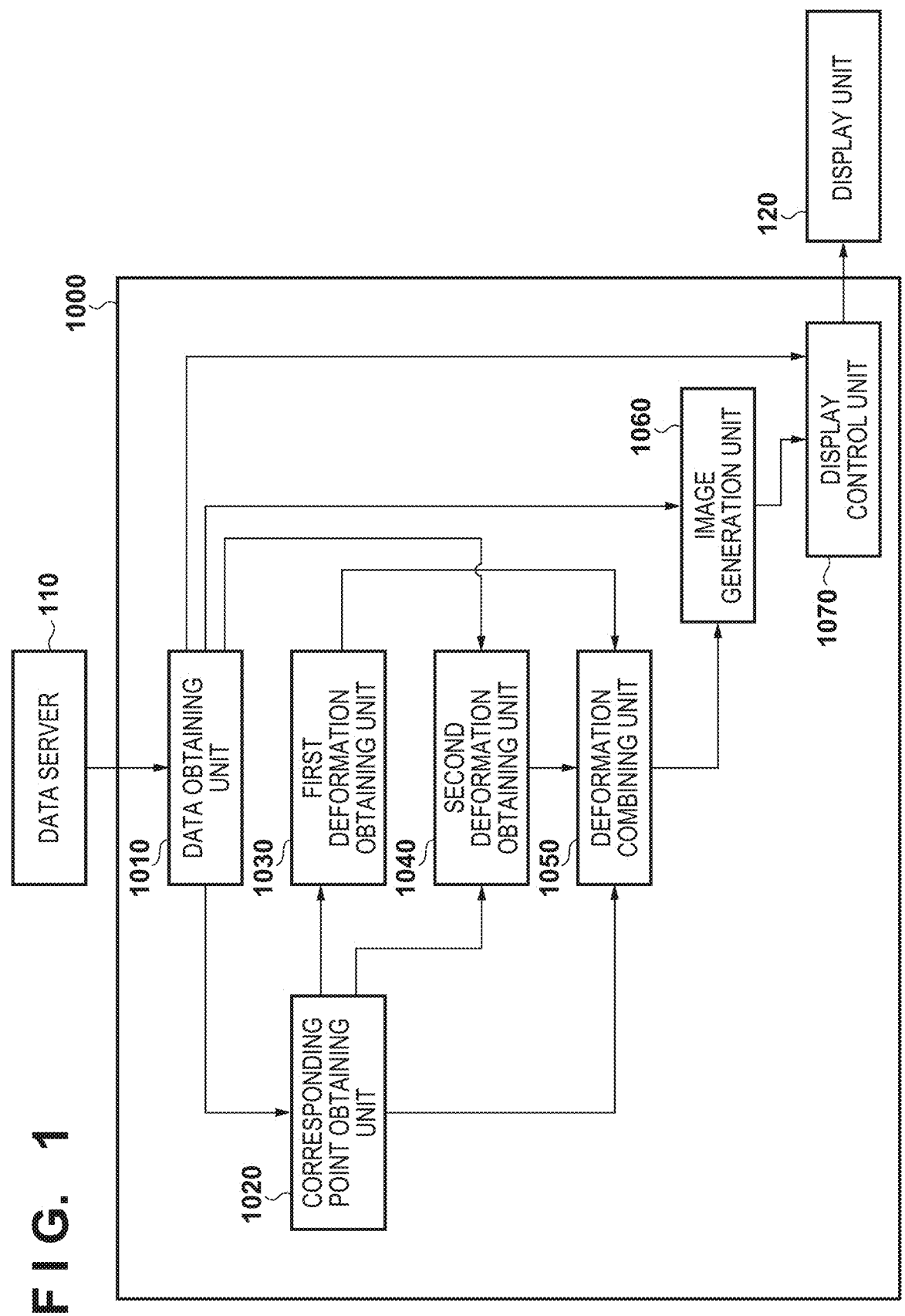
FIG. 1 is a diagram showing the device configuration of an image processing apparatus according to a first embodiment.

FIG. 1 shows a configuration example of an image processing system and an image processing apparatus according to this embodiment. As shown in FIG. 1, the image processing system in this embodiment has an image processing apparatus 1000, a data server 110, and a display unit 120, The image processing apparatus 1000 is connected to the data server 110 and the display unit 120.

The data server 110 holds first and second images. Here, the first and second images are three-dimensional tomographic images (volume data) acquired by capturing images of an object in advance under different conditions (e.g., different modalities, image capturing modes, times, and postures). A modality that captures a three-dimensional, tomographic image may be an MRI apparatus, an x-ray CT apparatus, a three-dimensional, ultrasonography shooting apparatus, a photoacoustic tomography apparatus, a PET/SPECT apparatus, an OCT apparatus, or the like. PET is an abbreviation of Positron Emission Tomography, and SPECT is an abbreviation of Single Photon Emission Computed Tomography. OCT is an abbreviation of Optical Coherence Tomography. The first and second, images may be images captured during the same period of time by different modalities in different image capturing modes, for example. In addition, the first and second images may be images of the same patient in the same posture captured by the same modality at different times for follow-up observation. The first and second images are input to the image processing apparatus 1000 via a data obtaining unit 1010.

The display unit 120 is a liquid crystal monitor or the like, and displays various types of information such as a display image generated by the image processing apparatus 1000. In addition, a GUI (Graphical User Interface) for obtaining an instruction from the user is arranged, in the display unit 120.

The image processing apparatus 1000 includes the data obtaining unit 1010, a corresponding point obtaining unit 1020, a first deformation obtaining unit 1030, a second deformation obtaining unit 1040, a deformation combining unit 1050, an image generation unit 1060, and a display control unit 1070.

The data obtaining unit 1010 obtains first and second images that have been input to the image processing apparatus 1000. The corresponding point obtaining unit 1020 obtains the positional information regarding corresponding points that correspond to each other between the first and second images. The first deformation obtaining unit 1030 performs first deformation registration for accurately matching the corresponding points between the first image and the second image, and obtains a first displacement field representing deformation between the first image and the second image. The second deformation obtaining unit 1040 performs second deformation registration that is based on a predetermined constraint condition, and obtains a second displacement field representing deformation between the first image and the second image. The deformation combining unit 1050 generates a combined displacement field acquired by combining the first displacement field and the second displacement field at rates that are based on the distances from the corresponding points. The image generation unit 1060 generates a deformed image acquired by deforming the first image based on the combined displacement field, a difference image between the second image and the deformed, image, and the like. The display control unit 1070 performs control so as to cause the display unit 120 to display information such as tomographic images of the first image, the second image, the deformed image, and the difference image.

Here, in this embodiment, image deformation that is performed in the image processing apparatus 1000 and a displacement field that is used during the image deformation will be described. In this embodiment, deformation when registration is performed between images is denoted by $\Phi$. Furthermore, in this embodiment, an evaluation function (a cost function) for evaluating the appropriateness of registration based on the deformation $\Phi$ is defined, and the deformation $\Phi$ that minimizes the evaluation function is estimated. The deformation $\Phi$ estimated at this time is expressed as a displacement field. Here, the form of the displacement field may be a displacement vector field constituted by displacement vectors for displacing positions in an image, but deformation does not need to be expressed as a spatial, field, and may be expressed in the form of a conversion parameter of a predetermined conversion model that makes it possible to displace any position in an image. In addition, in this embodiment, a displacement field for deforming a first image and registering the first image with a second image is estimated as the deformation $\Phi$.

At this time, when a displacement field having displacement amounts in a direction toward the second image (the displacement field in this direction is $\Phi$) at the respective coordinates in the first image is calculated as a displacement field for deforming the first image, displacement amounts corresponding to all of the coordinates in the second image, which is a result of deforming the first image, are not necessarily obtained. Therefore, when the pixel values in the first image are mapped onto the second image using this displacement field $\Phi$, a deformed image with spike noise is generated. In view of this, in this embodiment, a displacement field having displacement amounts in a direction from the second image toward the first image (a displacement field $\Phi^{-1}$ the opposite direction to the above displacement field $\Phi$) at the respective coordinates in the second image is calculated as a displacement field for deforming the first image. Accordingly, a deformed image of the first image that does not have spike noise can be generated by referencing and acquiring the pixel values of the positions in the first image corresponding to the coordinates in the second image, using the displacement field $\Phi^{-1}$ in the opposite direction, and performing mapping on the second image. Accordingly, in this embodiment, the displacement field $\Phi^{-1}$ in the opposite direction is obtained as a displacement field representing the deformation $\Phi$ for registering the first image with the second image.

Processing

Figure 2:
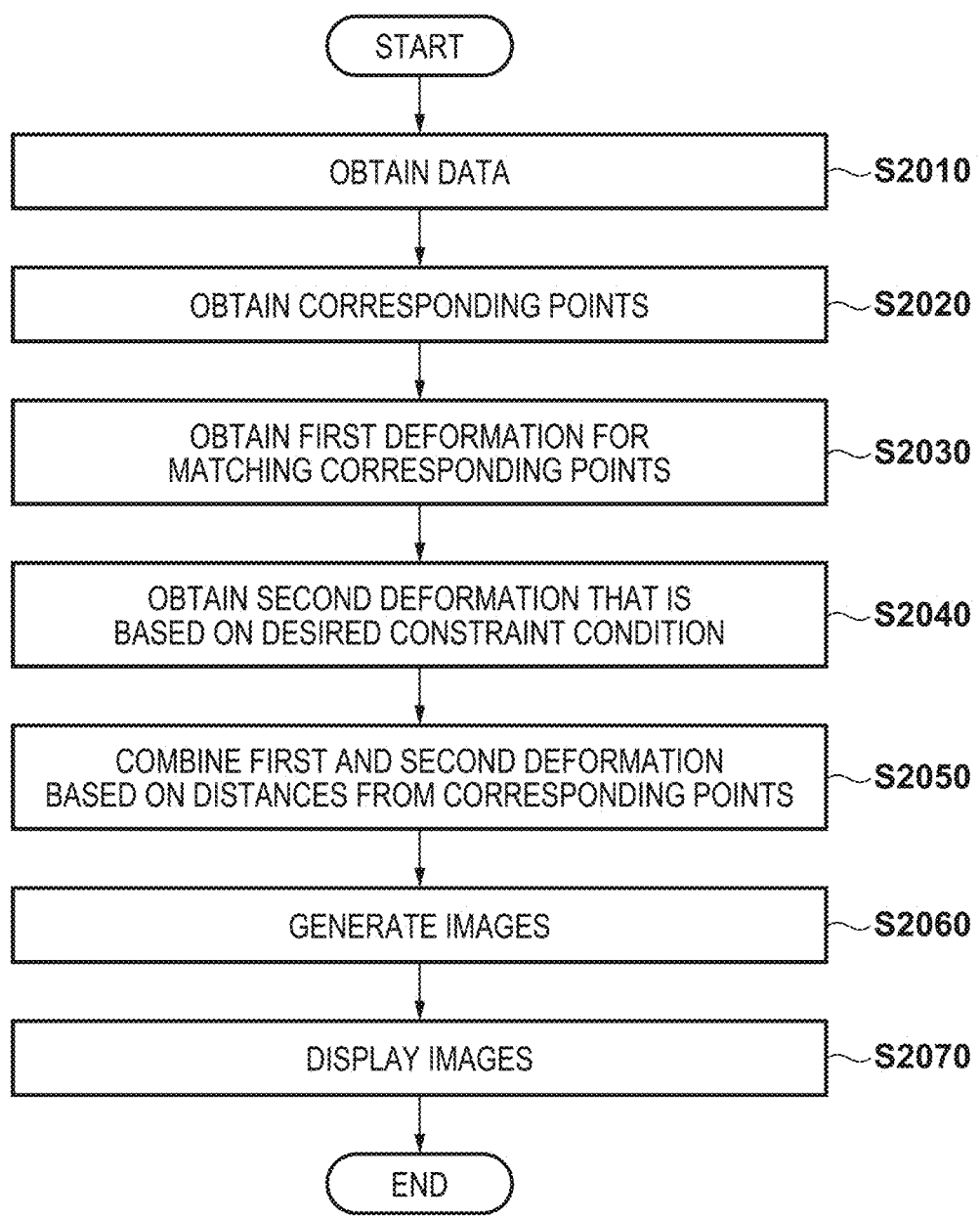
FIG. 2 is a flowchart showing an overall processing procedure in the first embodiment.

FIG. 2 is a flowchart showing an overall processing procedure that is performed by the image processing apparatus 1000 according to this embodiment.

Step S2010: Obtain Data

In step S2010, the data obtaining unit 1010 obtains a first image and a second image from the data server 110. The data obtaining unit 1010 then outputs the first and second images to the corresponding point obtaining unit 1020, the second deformation obtaining unit 1040, the image generation unit 1060, and the display control unit 1070.

Figure 3:
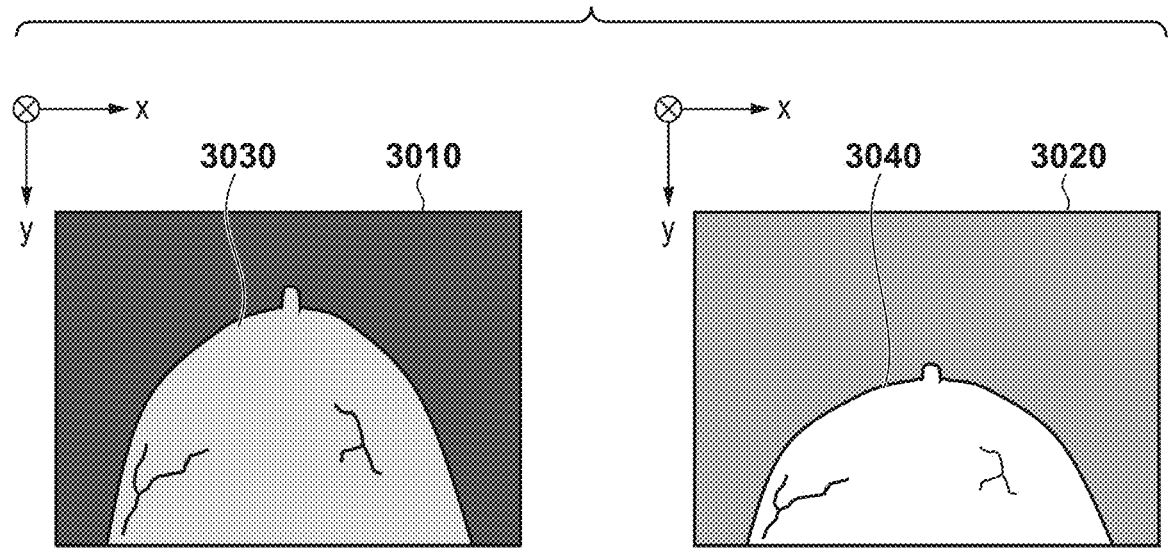
FIG. 3 is a diagram showing an example of a first image and a second image that are to be registered.

FIG. 3 is a diagram showing an example of a first image and a second image that are to be registered. Reference numeral 3010 in FIG. 3 indicates a first image, and reference numeral 3020 indicates a second image. These images each represent a piece of three-dimensional, volume data such as a CT, MRI, or 3D ultrasonography image, but the images 3010 and 3020 are shown in the form of a cross-sectional image along an x-y plane of the volume data since the space is two-dimensional. In addition, reference numerals 3030 and 3040 respectively indicate the object region in the first image and the object region in the second image. In the example in FIG. 3, a case is shown in which the first image and the second image are images captured by different types of modalities, and the object is a breast of a human body. In the example in FIG. 3, the region of the object (breast) is largely deformed between the first image and the second image.

Step 2020: Obtaining Corresponding Points

In step S2020, the corresponding point obtaining unit 1020 obtains the positional information regarding feature points (corresponding points) that anatomically correspond to each other between the first image and the second image. The obtained positional information regarding the corresponding points is output to the first deformation obtaining unit 1030, the second deformation obtaining unit 1040, and the deformation combining unit 1050.

Figure 4:
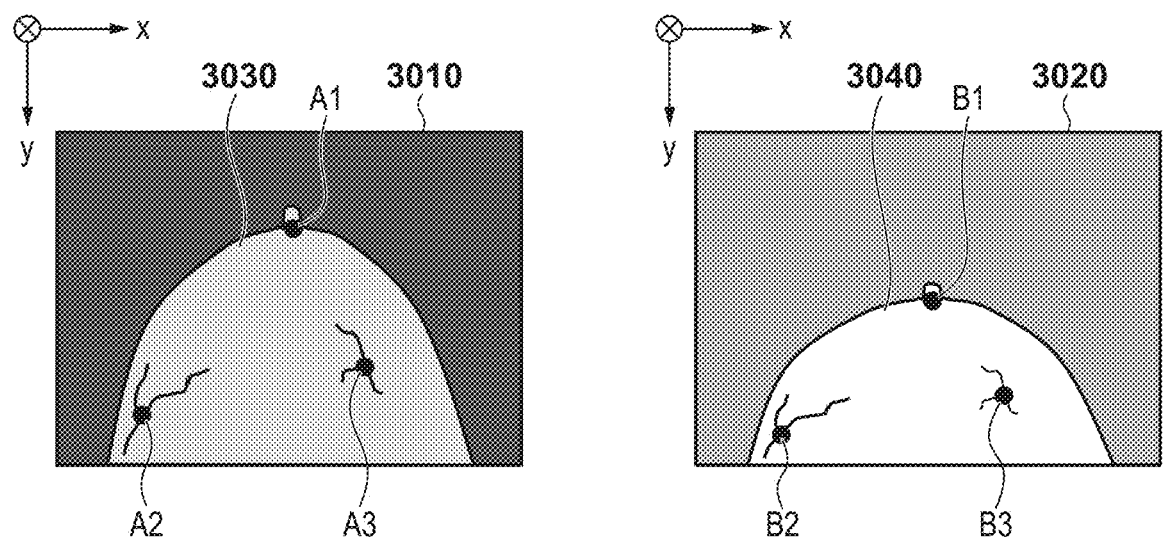
FIG. 4 is a diagram showing an example of corresponding points between a first image and a second image.

FIG. 4 is a diagram showing an example of corresponding points between a first image and a second image. In FIG. 4, points A1 to A3 in the first image 3010 and points B1 to B3 In the second image 3020 are corresponding points (a papilla and vascular bifurcations) between the two images, and the points A1 to A3 respectively correspond to the points B1 to B3. Note that, in FIG. 4, in order to simplify the illustration, the corresponding points are illustrated as being on the same plane (a cross section), but actual corresponding points are distributed in a three-dimensional space defined by the Images (the first image and the second image). For example, as a method for obtaining such corresponding points, known processing for extracting image feature points such as an interest operator is first performed on the first image and the second image, and anatomical feature points such as a papilla and vascular bifurcations are extracted from each of the images. After that, the extracted feature points are associated in one-to-one correspondence, and thus processing for generating pairs of corresponding points is performed. This is performed by setting interest regions in the vicinity of the respective feature points, and associating feature points whose interest regions between the images have high image similarity.

Note that a method for obtaining corresponding points is not limited to the above-described method, and corresponding points may be obtained by displaying a first image and a second image on the display unit 120, and the user manually inputting corresponding points using an operation unit (not illustrated.) A configuration may also be adopted in which, in the case where the data server 110 holds coordinate information regarding corresponding point groups between the first image and the second image in advance as accessory information regarding the images, the coordinate information is input from the data server 110.

Step S2030: Obtaining First Deformation for Matching Corresponding Points

In step S2030, the first defoliation obtaining unit 1030 executes first deformation registration (estimation of a first displacement field representing deformation from the second image to the first image) for accurately matching the corresponding points obtained from the corresponding point obtaining unit 1020, using these corresponding points. At this time, deformation $\Phi$ estimated by performing first deformation registration is defined as a first displacement field $\Phi_1^{-1}$. The generated first displacement field $\Phi_2^{-1}$ is then output to the deformation combining unit 1050.

Here, an evaluation function that is defined in this step is referred to as a first evaluation function E1($\Phi$). In this embodiment, in order to match corresponding points between images, a degree-of-deviation term L($\Phi$) of the positions of the corresponding points between the first image and the second image, which is expressed as the following expression, is applied as an indicator constituting the first evaluation function.

Expression 1

$$E1(\Phi) = L(\Phi) = \sum_{i=1}^{N} \|x_{Ai} - \Phi_1^{-1}(x_{Bi})\| \quad (1)$$

Here, $\Phi_1^{-1}(x)$ indicates a coordinate acquired by displacing a coordinate x in the second image toward the first image using the displacement field $\Phi_1^{-1}$ representing first deformation $\Phi_1$. In addition, $(x_{A1} x_{B1})$ indicate a pair of coordinates of the i-th corresponding points A1 and B1 in the first image and the second image, respectively, N indicates the number of corresponding points.

The first deformation obtaining unit 1030 optimizes a conversion parameter of a predetermined conversion model that represents the deformation $\Phi_1$ so as to minimize the first evaluation function E1. Accordingly, deformation that is optimum for matching corresponding points is estimated as registration of the entire object in the images. In this embodiment, a conversion model that can derive deformation for matching corresponding points by optimizing the evaluation function E1 is used as the predetermined conversion model that represents the deformation $\Phi_1$. For example, a conversion model that is constituted, by radial basis functions in which each corresponding point position (i.e., $x_{B1}$) in the second image is used as a reference point is applied. Here, a radial basis function refers to a function that defines a value depending only on the distance from a predetermined reference point, and is also referred to as RBF. A deformation estimation technique that is based on a radial basis function has a characteristic of being capable of completely matching corresponding points between images in theory (E1 can be set to 0) by optimizing the evaluation function E1 of Expression 1. Although, the positions of corresponding points do not match completely in actuality due to a calculational error, the position error between the corresponding points can be extremely close to being zero, and thus the corresponding points can be matched accurately. In this embodiment, Thin Plate Spline (TPS) that can minimize bending energy of deformation, in other words, enables smooth deformation, is applied, as a radial basis function. Note that the radial basis function is not limited, thereto, and any radial basis function such as a Gaussian function may be applied. Furthermore, a conversion model that is applied is not limited to a radial basis function, and any technique may be used as long as the evaluation function E1 for matching corresponding points can be optimized, and corresponding points can be accurately matched. Any known conversion model that can represent, deformation such as Free Form Deformation (FFD) and Large Deformation Diffeomorphic Metric Mapping (LDDMM) may be used. Note that first deformation does not necessarily need to be deformation for matching corresponding points, and it suffices for first deformation to be deformation according to which the degree of coincidence of corresponding points is higher than that of second deformation, which will be described later. For example, deformation using a deformation model that is similar to second deformation, and in which the weight of the regularization term is less than that of second deformation may be used.

Step S2040: Obtaining Second Deformation That Is Based on Desired Constraint Condition In step S2040, the second deformation obtaining unit 1040 executes second deformation registration (estimation of a second displacement field that represents deformation from the second image to the first image) that is based on a desired constraint condition, using the corresponding points obtained from the corresponding point obtaining unit 1020. At this time, the deformation $\Phi$ estimated by performing second deformation registration is defined as a second displacement field $\Phi_2^{-1}$. The generated second displacement field $\Phi_2^{-1}$ is then output to the deformation combining unit 1050.

Here, an evaluation function that is defined in this step is referred to as a second evaluation function $E2(\Phi)$ In this embodiment, a desired constraint condition in deformation is added to the constraint condition (the evaluation function $E1(\Phi)$) for matching the corresponding points in step S2030, such that luminance information regarding the entirety of the images matches between the images, and physically unnatural deformation is prevented. In order to satisfy such a constraint condition, an expression that is constituted by a degree-of-deviation term $L(\Phi)(=E1(\Phi))$ of corresponding points, an image similarity term $S(\Phi)$, and a regularization term $R(\Phi)$ as in the following expression is applied as an indicator constituting the second evaluation function.

Expression 2

$$E2(\Phi) = E1(\Phi) + \lambda_S \cdot S(\Phi) + \lambda_R \cdot R(\Phi) \quad (2)$$
$$= L(\Phi) + \lambda_S \cdot S(\Phi) + \lambda_R \cdot R(\Phi)$$

Here, the image similarity term is defined as $S(\Phi)=S(\Phi(I_1), I_2)$. Note that $I_1$ indicates a first image, and $I_2$ indicates a second image. In addition, $\Phi(I_1)$ indicates a deformed image acquired by deforming the image $I_1$ losing the displacement field $\Phi^{-1}$. As a scale at which the image similarity is calculated, a commonly used known technique such as Sum of Squared Difference (SSD), a mutual information amount, or a mutual correlation coefficient is used. In this embodiment, for example, a mutual information amount is applied. In addition, $R(\Phi)$ is a regulation term for imposing a penalty on deviation of deformation from a predetermined physical model such that the deformation $\Phi$ will not be physically unnatural. Commonly used bending energy regularization or volume preservation regularization is used as the regularization term. In this embodiment, for example, volume preservation regulariation is applied. In addition, $\lambda_S$ and $\lambda_R$ respectively indicate the weights of the similarity term $S(\Phi)$ and the regularization term $R(\Phi)$ and in this embodiment, for example, $\lambda_S=1.0$ and $\lambda_R=1.0$ are applied.

Note that the evaluation function E2 in this embodiment is not limited to the form of Expression 2, and any one of $L(\Phi)$, $S(\Phi)$, and $R(\Phi)$ may be omitted. In addition, $R(\Phi)$ may be constituted by a plurality of types of regularization, for example, bending energy regularization and volume preservation regularization. In addition, the evaluation function E2 may be any evaluation function as long as the constraint condition desired by the user can be represented. For example, a shape term for matching the surface shape of the object and the like may be included. Note that, due to a configuration in which two types of displacement fields are combined in step S2050 that will be described later, it is desirable that the evaluation function E2 includes the evaluation function E1, namely the degree-of-deviation term $L(\Phi)$ of corresponding points (the reason for this will be described later in detail).

The second deformation obtaining unit 1030 optimizes the conversion parameter of the predetermined conversion model that represents deformation $\Phi_2$ so as to minimize the second evaluation function E2. Accordingly, deformation that is optimum in that the desired constraint condition is satisfied is estimated as registration of the entire object in the images. In this embodiment, FFD that is a technique that enables deformation estimation based on any evaluation function is applied as the conversion model, and the evaluation function is optimized by performing nonlinear optimization processing.

Note that a conversion model that is applied and a technique for optimizing the conversion model may be any model or technique as long as deformation estimation can be performed based on an evaluation function to which a desired constraint condition has been added. In addition, second deformation may be any type of deformation as long as expectation values of accuracy are higher than those of first deformation overall.

Step S2050: Combining First and Second Deformation Based on Distances from Corresponding Points In step S2050, the deformation combining unit 1050 generates a combined displacement field $\Phi_{1+2}^{-1}$ by combining the first displacement field $\Phi_1^{-1}$ and the second displacement field $\Phi_2^{-1}$ based on the distances from the corresponding points obtained from the corresponding point obtaining unit 1020. The generated combined displacement field $\Phi_{1+2}^{-1}$ is then output to the image generation unit 1060.

Specific processing will be described below. The deformation combining unit 1050 combines, at each of the coordinates in the second image, the first displacement field $\Phi_1^{-1}$ and the second displacement field to $\Phi_2^{-1}$ based on the distances from the corresponding points in the second image. At this time, the first displacement field $\Phi_1^{-1}$ and the second displacement field have been obtained as displacement fields in the opposite direction toward the first image, at each of the coordinates in the second image as described above. Therefore, as shown in the following expression, by simply weighting and adding the displacement amounts of the first displacement field $\Phi_1^{-1}$ and the second displacement field $\Phi_2^{-1}$ at a predetermined combining ratio at each of the coordinates x in the second image, a combined displacement field having a displacement amount combined at each of the coordinates in the second image can be obtained.

Expression 3

$$\Phi_{1+2}^{-1}(x) = w_1(x) \cdot \Phi_1^{-1} + w_2(x) \cdot \Phi_2^{-1}(x) \qquad (3)$$

Here, $w_1(x)$ and $w_2(x)$ each indicate a combining ratio at which the first displacement field is combined and a combining ratio at which the second displacement field is combined, at each of the coordinates x in the second image. Both satisfy the relationship of $w_1(x)+w_2(x)=1.0$. Note that the combining ratios $w_1(x)$ and $w_2(x)$ are calculated for the coordinate x of interest based on the distance from a corresponding point B1 ($123\ i \leq N$) in the second image, as in the following expression.

Expression 4

$$w_2(x) = \prod_{i=1}^{N} \{1 - g(x \mid x_{Bi}, \sigma^2)\} \qquad (4)$$

Expression 5

$$w_1(x) = 1 - w_2(x) \qquad (5)$$

Here, $x_{Bl}$ indicates the coordinates of the i-th corresponding point in the second image. $g(x)\mu, \sigma^2)$ in Expression 4 is a Gaussian function in which the coordinate $\mu$ is the average, and $\sigma^2$ is dispersion, and that does not include a regularization coefficient, and is a function that takes the maximum value 1 at the coordinate $\mu$, and radially decreases and approaches 0 centered on $\mu$ the farther the position is from $\mu$. This Gaussian function is one type of radial basis function. Here, the radial basis function is a function that defines a value depending only on the distance from a predetermined reference point, as described in step S2030.

Therefore, in the case where the average $\mu$ is a corresponding point coordinate $x_{B1}$ as $g(x|x_{B1}, \sigma^2)$ in Expression 4, a radial, basis function holds, which takes the maximum value 1 at the corresponding point coordinate $x_{B1}$, and decreases and approaches 0 the farther the position is from the corresponding point coordinate $x_{B1}$. In this embodiment, for example, $\sigma$=1.0 is applied. Furthermore, by subtracting this radial basis function from 1 as in $1-g(x|x_{B1}, \sigma^2)$, a radial basis function holds, which takes the minimum value 0 at the corresponding point coordinates $X_{B1}$, and increases and approaches the maximum value 1 the farther the position is from the points $x_{B1}$. This is defined as a radial basis function $r(x|x_{B1})$. In addition, as in Expression 4, as the combining ratio $w_2(x)$, when totaling radial basis functions $r(x|x_{B1})$ by repeating exponential multiplication of the radial basis functions $r(x|x_{B1})$ the number of times equivalent to the number of corresponding points N, a function (a combining ratio function) is acquired, which necessarily takes the minimum value 0 at the positions of all of the corresponding points, and approaches the maximum value 1 the farther the position is from all of the corresponding points. This is because of a property that, when a plurality of functions are multiplied at some coordinates x, if the value of any one of the functions is 0, the result naturally is 0,and if the maximum values of all of a plurality of functions are 1, the maximum value of a function acquired by multiplying the functions is also 1. The combining ratio $w_2(x)$ acquired in this manner is a function acquired by multiplying the radial basis functions $r(x|x_{B1})$ that define a value only according to the distances from corresponding points, and thus $w_2(x)$ can be said to be a function that defines a value according to the distances from the corresponding points.

Note that, in this embodiment, in Expression 4, a Gaussian function is used as a function g, but the present invention is not limited thereto, and any radial basis function that takes the maximum, value 1 at corresponding points, and decreases the greater the distance is from the corresponding points may be applied. In addition, $w_2(x)$ may be any function that necessarily takes 0 at the positions of all of the corresponding points, and approaches 1 the farther the position is from all of the corresponding points, and does not necessarily need to be represented by Expression 4. Lastly, as the combining ratio $w_1(x)$, by subtracting the combining ratio $w_2(x)$ from 1 as in Expression 5, a function is acquired, which necessarily takes 1 at the positions of all of the corresponding points, and approaches 0 the farther the position is from, all of the corresponding points. Therefore, $w_1(x)$ is also a radial basis function, and is a function that defines a value according to distances from corresponding points.

Note that, in this embodiment, the combining ratio function is a function represented as a multiplication of radial basis functions, but is not limited thereto, and anything that is acquired by totaling radial basis functions may be applied. For example, it is possible to apply a function in which the sum value when weighing and then adding all of the radial basis functions on the corresponding points is 0. This can be obtained as will be described below. First, the weights when adding the radial basis functions are set to be unknown values, and the value of the combining ratio function on corresponding points that is represented as the weighted sum of all of the radial basis functions is set to be a known value 0. By setting and solving simultaneous equations (in which the weighted, sum of all of the radial basis functions at corresponding points=0) in correspondence with the number of corresponding points, the weights of all of the radial basis functions that are unknown numbers can be calculated. In addition, the combining ratio function can be expressed as the sum of the radial basis functions including the weights calculated in this manner, and takes the value 0 on corresponding points. Note that, if the combining ratio function that is represented, by the sum of the radial basis functions is adopted without any change, the value exceeds 1 at a position distanced from the corresponding points. In view of this, lastly, by dividing the entirety of the combining ratio functions by the number of radial basis functions (the number of corresponding points) N, and performing regularization, the maximum value of the combining ratio function can be set to 1. Note that the value of the combining ratio function is 0 on the corresponding points, and thus it is guaranteed that the value after regularization is also 0.

Figure 5:
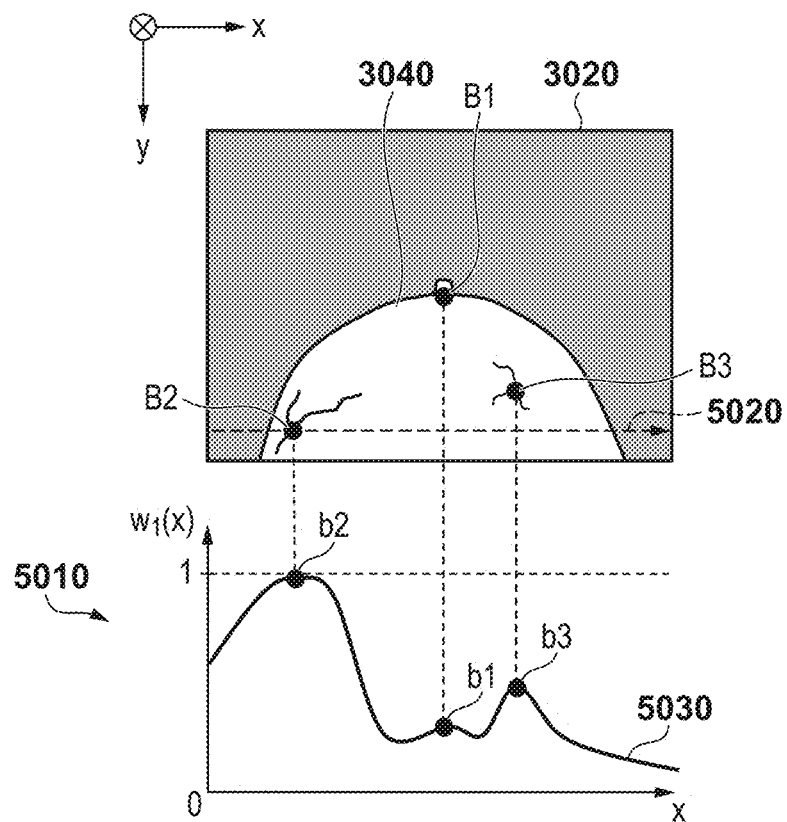
FIG. 5 is a diagram showing a graph of a combining ratio of a first displacement field at predetermined positions in an image.

FIG. 5 is a diagram showing a graph of a combining ratio of a first displacement field at predetermined positions in an image. In FIG. 5, reference numeral 5010 is a graph showing the combining ratio $W_1(x)$ of the first displacement field in the X direction, at y, z coordinates in the second, image 3020. Reference numeral 5020 indicates a line in the X direction at some y,z coordinates, the line corresponding to the graph 5010. Furthermore, a curve 5030 in the graph 5010 represents the shape of the function of the combining ratio $w_1(x)$. In addition, x coordinates of points b1, b2, and b3 on the curve 5030 represent the values of the combining ratios $w_1(x)$ corresponding to corresponding points B1, B2, and B3. In FIG. 5, the point B2 corresponding to the point b2 on the curve 5030 Is positioned on the line 5020, and thus the value of a radial basis function $r(x|x_{B2})$ corresponding to the point B2 is 0, and $w_2(x_{B2})$ also is 0. Therefore, it can be seen that the value at the point b2 takes $w_1(x_{B2})=1.0$. In addition, the point B3 corresponding to the point b3 is positioned near the line 5020, but not on the line 5020. Therefore, it is seen that a position on the line 5020 is relatively largely affected by a radial basis function $r(x|x_{B3})$ corresponding to the point B3, and that a value on the point b3 takes a large value. On the other hand, the point B1 corresponding to the point b1 distanced, from the line 5020. Therefore, it is seen that a position on the line 5020 is somewhat less affected by a radial basis function $r|x|x_{B1}$ corresponding to the point B1 and that a value $w_1(x_{B1})$ on the point b1 takes a small value. In this manner, it is seen that, at a position on the line 5020, the closer a position is to the one of the corresponding points (e.g., in the vicinity of the point B2), the higher the combining ratio of the first displacement field is, and that the farther a position is from any of the corresponding points (e.g., in the vicinity of the center of the line 5020), the higher the combining ratio of the second displacement field is. In actuality, corresponding points are usually thinly distributed in a three-dimensional image space, and thus the influence of the first displacement field for accurately matching corresponding points is larger in the vicinity of the corresponding points, and the influence of the second displacement field that is based on a desired constraint condition is large in most of the region, namely a region excluding the vicinity of the corresponding points. Therefore, it is possible to accurately match the corresponding points, and realize desired registration in the images as a whole, Note that the second displacement field is based on a desired constraint condition, and thus the evaluation function for registration does not necessarily need to include the degree-of-deviation term. $L(\Phi)$ of the corresponding points such that Expression 2 in step S2020 holds. However, for the following reason, more appropriate registration can be realized if $L(\Phi)$ is included. If the evaluation function E2 does not include the degree-of-deviation term. $L(\Phi)$ of the corresponding points, there is a possibility that large residue of the corresponding points will occur in deformation that is based on the second displacement field. Therefore, a large difference between the second displacement field and the first displacement field for accurately matching the corresponding points occurs in the periphery of the corresponding points. As a result, there is a possibility that a combined displacement field acquired by combining the second displacement field and the first displacement field will greatly change in the periphery of the corresponding points, and the deformation result will be unnatural. If the evaluation function E2 includes $L(\Phi)$, the second displacement field leads to residue between the corresponding points, but can be a displacement field for roughly matching corresponding points. Therefore, the second displacement field hardly differs from the first displacement field in the vicinity of the corresponding points, and thus, as a result of combining the two displacement fields, more natural registration can be performed.

Step S2060: Generation of Image

In step S2060, the image generation, unit 1060 generates a deformed image by deforming the first image obtained from the data obtaining unit 1010, based, on the combined displacement field obtained from the deformation combining unit 1050. In addition, a difference image acquired by performing subtraction between the second image obtained from the data obtaining unit 1010 and the generated deformed image is generated. In this embodiment, the difference image is generated by subtracting the deformed image from the second image. Note that it is also possible to generate a deformed image (inversed deformed image) by deforming the second image so as to coincide with the shape in the first image, based on the combined displacement field, as necessary. In addition, the direction in which subtraction is performed may be opposite. Also, one of the deformed image and the difference image does not need to be generated. The image generation unit 1060 then outputs the deformed image and the difference image that have been generated to the display control unit 1070. In addition, the generated images are output to the data server 110, and are stored.

Step S2070: Display of Image

In step S2070, the display control unit 1070 performs control so as to display the obtained images on the display unit 120 according to an operation made by a user on a UI (not illustrated). Specifically, control is performed so as to display the first image and the second image obtained, from the data obtaining unit 1010, and cross-sectional images of the deformed image and the difference image obtained from the image generation unit 1060. At this time, a configuration can be adopted in which the deformed image acquired by deforming the first image, and the second image are displayed, side by side. Furthermore, a configuration may be adopted in which the first image is additionally displayed along with the second image and the deformed image side by side. A configuration may also be adopted in which the deformed image and the difference image can be switched and displayed in one display screen region according to a user operation. Note that a configuration may be adopted in which the deformed image and the difference image are not displayed. Processing of the image processing apparatus 1000 is performed as described above.

As described above, according to this embodiment, it is possible to obtain a deformation result that is more affected by first deformation for accurately matching the corresponding points, the closer to the corresponding points, and is more affected by second deformation for a desired constraint condition, the farther away from the corresponding points. Therefore, it is possible to perform registration of images as a whole that complies with the desired constraint condition, while accurately matching the corresponding points between the images.

Deformation Example 1-1: Displacement Fields May Be Combined Based on Distances from Corresponding Points in First Image In the first embodiment, in step S2050, the first displacement field and the second displacement field are combined based on the distances from the corresponding points in the second image. However, the two displacement fields may be combined based on the distances from the corresponding points in the first image. Here, as described in step S2020, the deformation $\Phi$ in this embodiment is replaced by the displacement field $\Phi^{-1}$ in the opposite direction having displacement amounts in the direction from the second image toward the first image, regarding the coordinates in the second image. In view of this, a combining ratio is calculated by referencing the positions in the first image corresponding to the coordinates in the second image, using this displacement field $\Phi^{-1}$. Accordingly, as in the following expression, a ratio that is based on the distances from corresponding points Ai ($1 \le i \le N$) in the first image, at the reference positions in the first image corresponding to the coordinates in the second image can be calculated via the displacement field $\Phi^{-1}$.

Expression 6

$$w_2(x) = \prod_{i=1}^{N} \{1 - g(\Phi^{-1}(x) | x_{Ai}, \sigma^2)\} \quad (6)$$

Here, in place of Expression 4 in the first embodiment, $w_2(x)$ indicates a combining ratio at which the second displacement field is combined at the coordinates x in the second image. In addition, $\Phi^{-1}(x)$ indicates a coordinate acquired by displacing a coordinate x in the second image toward the first image using the displacement field $\Phi^{-1}$. Here, a certain displacement field needs to be provided as the displacement field $\Phi^{-1}$ in order to convert the coordinates x into the coordinates $\Phi^{-1}(x)$ in the first image, but as a matter of course, at a stage before a combining ratio is calculated, a combined displacement field that is a target has not been obtained. Therefore, here, the first displacement field $\Phi_1^{-1}(x)$ is applied as $\Phi^{-1}(x)$. Note that $\Phi^{-1}(x)$ is not limited thereto, and the second displacement field $\Phi_2^{-1}(x)$ may be used. Furthermore, a displacement field acquired by combining the first displacement field $\Phi_1^{-1}(x)$ and the second displacement field $\Phi_2^{-1}(x)$ at a certain ratio (e.g., the same ratio) may be used.

Furthermore, displacement fields may be combined based on both the distances from the corresponding points in the first image and the distances from the corresponding points in the second image. At this time, the combining ratio can be calculated using the following expression.

Expression 7

$$w_2(x) = a \cdot \prod_{i=1}^{N} \{1 - g(\Phi^{-1}(x) | x_{Ai}, \sigma^2)\} + b \cdot \prod_{i=1}^{N} \{1 - g(x | x_{Bi}, \sigma^2)\} \quad (7)$$

Here, in place of Expression 4 of the first embodiment and Expression 6 above, $w_2(x)$ indicates a combining ratio at which the second displacement field is combined at the coordinate x in the second image. In addition, "a" indicates a ratio at which the distances from corresponding points in the first image is used, and "b" indicates a ratio at which the distances from the corresponding points in the second image is used, satisfying a+b=1.0. Here, for example, a=0.5 and b=0.5 are applied.

As described above, according to this deformation example, a combined displacement field can be obtained in which the positional relationship of the corresponding points in the first image is taken into consideration, by combining displacement fields based on the distances from the corresponding points in the first image.

Deformation Example 1-2: Combining Ratio May Be Calculated Based on Reliability of Corresponding Points In the first embodiment, a combining ratio is calculated such that $w_1(x)=1$ necessarily holds on corresponding points, in other words, two displacement fields are combined such that the corresponding points necessarily match. However, a combining ratio may be calculated such that $w_1(x)=1$ does not necessarily hold on the corresponding points. For example, a configuration may be adopted in which reliability regarding the correspondence relationship is set for each corresponding point, and a combining ratio is calculated according to the reliability. More specifically, if the reliability of the corresponding points is high, the two displacement fields are combined such that the corresponding points are matched more accurately, due to the value of $w_1(x)$ approaching 1. On the other hand, if the reliability of the corresponding points is low, the two displacement fields are combined such that the corresponding points can be matched less accurately, due to the value of $W_1(x)$ approaching 0. At this time, the combining ratio is expressed as the following expression.

Expression 8

$$w_2(x) = \prod_{i=1}^{N} \{1 - C_i \cdot g(x | x_{Bi}, \sigma^2)\} \quad (8)$$

Here, in place of Expression 4 of the first embodiment, $w_2(x)$ indicates a combining ratio at which the second displacement field is combined at a coordinate x in the second image. In addition, Ci is a ratio that satisfies $0 \le C_i \le 1.0$, and indicates the reliability of each corresponding point ($1 \le i \le N$). In Expression 8, a function acquired by multiplying a Gaussian function $g(x|x_{B1}, \sigma^2)$ that takes the maximum value 1.0 on the corresponding points by reliability Ci is a radial basis function that takes a maximum value Ci on the corresponding points. Therefore, as the reliability Ci decreases, the minimum valve of the combining ratio $w_2(x)$ of second deformation in the periphery of the i-th corresponding point increases above 0.0, in other words, the maximum value of the combining ratio $w_1(x)$ of first deformation in the periphery of the i-th corresponding point decreases below 1.0. In this manner, a combining ratio that is based on the reliability of each corresponding point can be set.

For example, the reliability Ci is set high in the case of corresponding points specified by the user, and as described in step S2020, is set low in the case of corresponding points automatically detected by a computer. For example, Ci=1.0 is set in the case of points specified, by a user, and $0 \le C_i \le 1.0$ is set in the case of points automatically detected by a computer. Furthermore, the values of points automatically detected by a computer can be determined according to the magnitude of the image similarity of an interest region in the vicinity of feature points between the images, the image similarity having been calculated when the feature points were associated as corresponding points in step S2020. For example, if the image similarity of each of the feature points between the images is defined as $Si(0 \le s_i \le 1.0)$, the reliability Ci is calculated as Ci=Si. In addition, for example, in the case where the farther a position is from the surface shape of the object, the lower the reliability of corresponding points obtained between the images is, the reliability Ci may be calculated according to the distance from the surface shape of the object, in that case, as a result of the reliability Ci taking a value that is inversely proportional to the distance from the surface shape of the object, the value of the reliability Ci can be set to increase the closer a position is to the surface shape, and to decrease the farther away a position is from the surface shape. In addition, a configuration may be adopted in which, in the case where the user specifies corresponding points, the user can designate certainty of correspondence of each of the corresponding points via a UI (not illustrated), and Ci is determined based on the certainty. As a method for providing the certainty, for example, a format can be used in which values of 0 to 1 are provided in a non-step manner. In this case, the certainty can be used as Ci without any change. At this time, a corresponding point whose certainty is smaller than or equal to a certain value may be excluded as the target of the product of Expression 8 (the same value as that when Ci=0 is acquired). In addition, a configuration may be adopted in which the user only specifies a label "reliably match" or "roughly match" via the UI (not illustrated) regarding each corresponding point, and a predetermined value of Ci=1.0 is set for a corresponding point that is to be "reliably matched", and a predetermined value of $0 \leq Ci \leq 1.0$ is set for a corresponding point that is to be "roughly matched".

As described above, according to this deformation example, by calculating a combining ratio according to the reliability of corresponding points, deformation close to deformation for matching corresponding points can be performed in the periphery of corresponding points having high reliability, and deformation close to deformation that is based on a desired constraint condition can be performed in the periphery of corresponding points having low reliability, making it possible to realize appropriate registration.

Second Embodiment

Overview

In the first embodiment, in step S2050, at the coordinates in the second image, a combining ratio of displacement fields is calculated based on distances from all of the corresponding points in the second image. In such a case, there are cases where the following problem occurs. If the number of corresponding points between images is large, due to an increase in the number of radial basis functions $r(x|x_{B1})$ in Expression 3, a function $w_2(x)$ acquired by multiplying those functions very steeply changes to 1 centered on a value 0, in the vicinity of the corresponding points. Accordingly, the combining ratio steeply changes in close proximity to the corresponding points, and thus displacement fields that are combined also change steeply, and there is a possibility that unnatural, deformation will occur in the vicinity of the corresponding points.

In view of this, in this embodiment, at each coordinate in the second image, a combining ratio of displacement fields is calculated based only on the distances from the corresponding points in the second image that are in the vicinity of the coordinate. Accordingly, even if the number of corresponding points between the images is large, corresponding points that are used for calculating a combining ratio at a position in the image are limited to points in the vicinity of the position, and thus the function of the combining ratio does not become steep, and two displacement fields are smoothly combined such that natural deformation registration can be realized.

Configuration

Regarding an mage processing apparatus according to this embodiment, only differences from the first embodiment will be described below.

The configuration of an image processing apparatus 1000 according to this embodiment is similar to that of the first embodiment, and thus a description thereof is omitted. However, a function of a deformation combining unit 1050 is different from that in the first embodiment, and thus the function will be described below. Other constituent elements have the same functions as in the first embodiment, and thus description regarding the same functions is omitted.

The deformation combining unit 1050 generates, at each coordinate in a second image, a combined displacement field acquired by combining a first displacement field and a second displacement field at a ratio that is based only on the distances from corresponding points that are in the vicinity of the coordinate.

Processing

Figure 6:
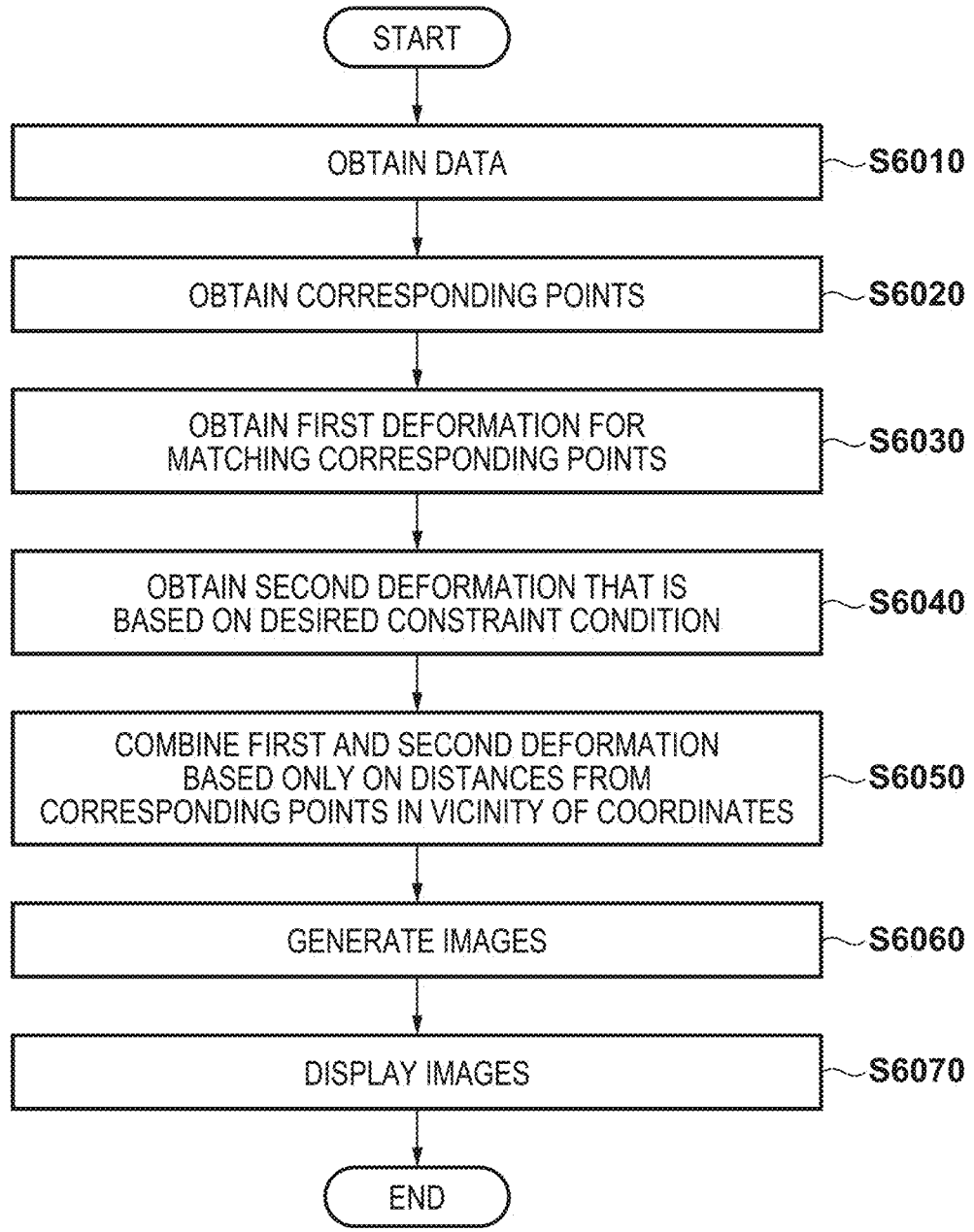
FIG. 6 is a flowchart showing an overall processing procedure in a second embodiment.

FIG. 6 is a flowchart showing an overall processing procedure that is performed by the image processing apparatus 1000 according to this embodiment. Note that, in FIG. 6, processing of steps S6010 to S6040 and processing of steps S6060 to SS070 are respectively the same as the processing of steps S2010 to S2040 and the processing of steps S2060 to S2070 in the flowchart in FIG. 2, and thus description thereof is omitted. Only differences from the flowchart in FIG. 2 will be described below.

Step S6050: Combining First Deformation and Second Deformation Based Only on Distances from Corresponding Points in Vicinity of Coordinate In step S6050, the deformation combining unit 1050 generates a combined displacement field $\Phi_{1+2}^{-1}$ acquired by combining a first displacement field $\Phi_{1+2}^{-1}$ and a second displacement field $\Phi_2^{-1}$ based on the distances from corresponding points obtained from a corresponding point obtaining unit 1020. Note that this step is different from step S2050 in the first embodiment In the following points. In step S2050, at each coordinate in the second, image that is a coordinate at which displacement fields are combined, a combining ratio of the displacement fields is calculated based on the distances from all of the corresponding points. On the other hand, in this step, at each coordinate in the second image, corresponding points in the second image that are in the vicinity of the coordinate are selected, and a combining ratio of displacement fields is calculated based only on the distances from the corresponding points. The combined displacement field $\Phi_{1+2}^{-1}$ that has been generated is then output to an image generation unit 1060.

Specific processing will be described below regarding the differences from step S2050 of the first embodiment. In this step, a combining ratio is calculated based only on the distances from K corresponding points in the vicinity of a coordinate x (K nearby corresponding points) in the second image. Specifically, a combining ratio is calculated using the following expression.

Expression 9

$$w_2(x) = \prod_{k=1}^{K} \{1 - g(x | x_{Bk}(x), \sigma^2)\} \tag{9}$$

Here, $w_2(x)$ indicates a combining ratio at which the second displacement field is combined at the coordinate x in the second image in place of Expression 4 in the first embodiment. In addition, the K corresponding points in the vicinity of the coordinate x are Indicated, as points $Bk(x)$ ($1 \leq k \leq$), and $x_{Bk}(x)$ indicates the coordinate of the point $Bk(x)$. In this embodiment, for example, K=5 is applied.

Note that a method for calculating a combining ratio based on the distances from corresponding points in the vicinity of the coordinate x in the second image is not limited to the above-described method, and for example, a combining ratio may be calculated based only on the distances from corresponding points that are within a certain range centered on the coordinate x (e.g., within a radius of 5 mm). Alternatively, a combining ratio may be calculated using a predetermined number of nearby corresponding points that are in a certain range from the coordinate x. Accordingly, the combining ratio $w_2(x)$ can be calculated based only on the distances from corresponding points in the vicinity of the coordinate x regardless of the total number of corresponding points between the images. Processing of the image processing apparatus 1000 in this embodiment is carried out in this manner.

As described above, according to this embodiment, even if the number of corresponding points between images is large, corresponding points used for calculating a combining ratio at each position in the image are limited to those in the vicinity of the position. Therefore, two displacement fields are smoothly combined without the function of the combining ratio being steep, and more natural, deformation registration can be realized.

Third Embodiment

Overview

In the first embodiment, in step S2050, the combining ratio of displacement fields is calculated based on a Gaussian function in which dispersion is fixed to a predetermined value σ. In such a case, there are cases where the following problem occurs. If large corresponding point residue occurs in a second displacement field representing second deformation, corresponding points are accurately matched in first deformation, and thus a large difference between the displacement fields occurs in the periphery of the corresponding points. At this time, in the first embodiment, when a combining ratio is calculated based on the Gaussian function in which dispersion is fixed to the predetermined value σ, the spread of the function of the combining ratio that is centered on corresponding points is fixed. Therefore, if the fixed valve σ is small, there is a possibility that a change in a displacement field in the periphery of corresponding points will be large as a result of combining two displacement fields having a large difference such that the ratio changes steeply over a spatially small range, and the deformation result will be unnatural. On the other hand, if the fixed value a is large, even if the difference between two displacement fields is small, there is a possibility that the influence of the first displacement field will be large over an unnecessarily broad range as a result of combining the two displacement fields such that the ratio changes over a spatially broad range. In other words, there is a possibility that the influence of the second displacement field that is based on a desired constraint condition will be small.

In view of this, in this embodiment, the magnitude of σ in a Gaussian function that corresponds to each corresponding point in the second displacement field is changed according to the magnitude of the corresponding point residue of the corresponding point, and a combining ratio is calculated. Accordingly, in the periphery of corresponding points in which corresponding point residue is large, displacement fields can be combined such that the ratio changes relatively smoothly over a broad range, and in the periphery of corresponding points in which corresponding point residue is small, displacement fields can be combined such that the ratio changes relatively steeply over a small range, making it possible to acquire a more natural deformation result.

Configuration

Regarding an image processing apparatus according to this embodiment, only differences from the first embodiment will be described below.

The configuration of the image processing apparatus according to this embodiment is similar to that of the first embodiment, and thus a description thereof is omitted. However, a second deformation obtaining unit 1040 and a deformation combining unit 1050 have functions different from those of the first embodiment, and thus these functions will be described below. Other constituent elements have the same functions as those in the first embodiment, and thus a description regarding the same functions is omitted.

The second deformation obtaining unit 1040 obtains a second displacement field for deforming a first image similar to the first embodiment. Furthermore, the second deformation obtaining unit 1040 in this embodiment obtains corresponding point residue in the second displacement field (processing for obtaining corresponding point residue). The deformation combining unit 1050 generates a combined displacement field acquired, by combining the first displacement field and the second displacement field at a ratio that is based on the distances from the corresponding points and the magnitude of the corresponding point residue.

Processing

Figure 7:
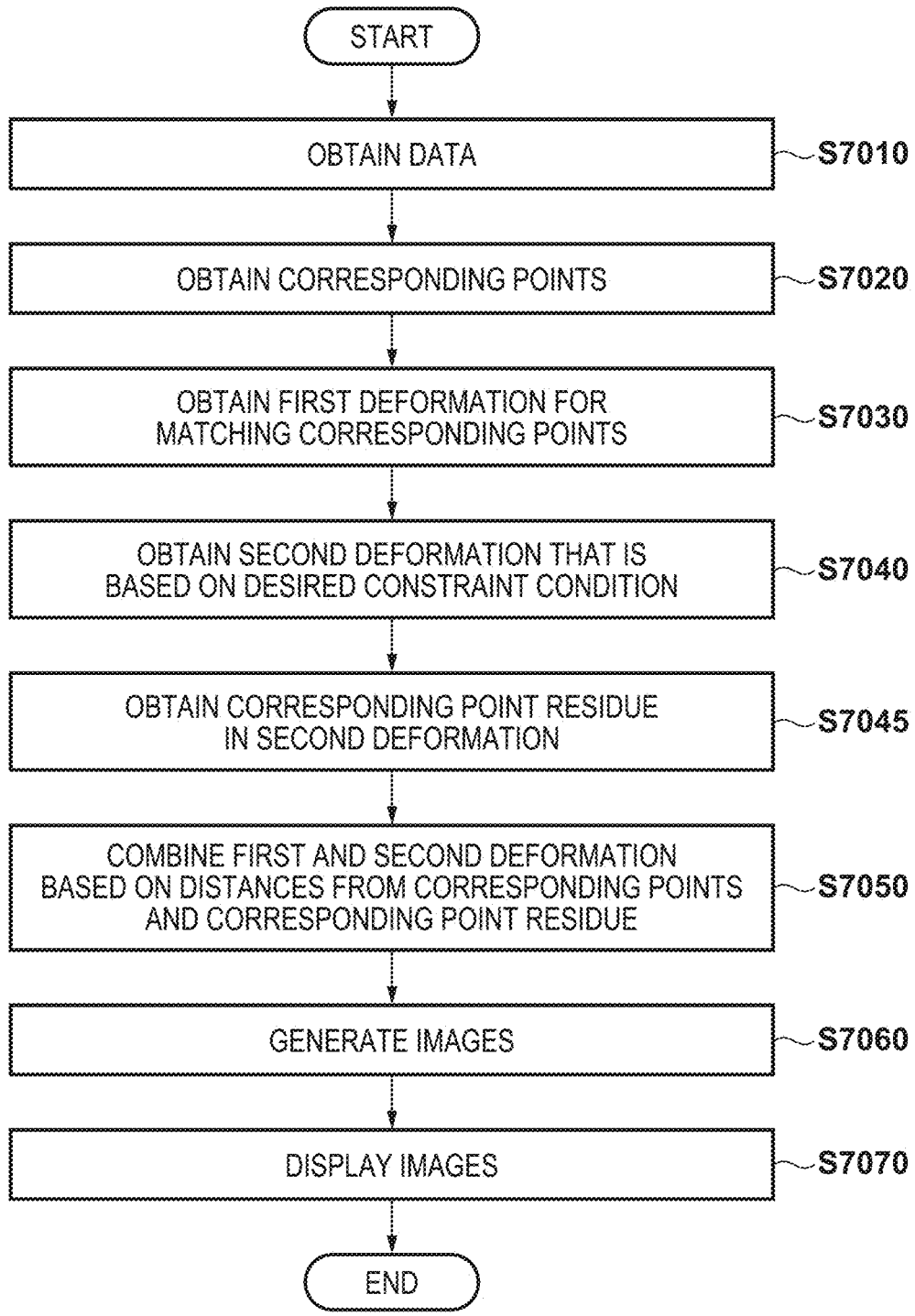
FIG. 7 is a flowchart showing an overall processing procedure in a third embodiment.

FIG. 7 is a flowchart showing an overall processing procedure performed by an image processing apparatus 1000 according to this embodiment. Note that, in FIG. 7, processing of steps S7010 to S7040 and processing of steps S7060 to S7070 are respectively the same as processing of steps S2010 to S2040 and processing of steps S2060 to S2070 in the flowchart in FIG. 2, and thus a description thereof is omitted. Only differences from the flowchart in FIG. 2 will be described below.

Step S7045: Obtaining Corresponding Point Residue in Second Deformation

In step S7045, the second deformation obtaining unit 1040 calculates corresponding point residue in a second displacement field $\Phi_2^{-1}$ obtained in step S7040. The calculated corresponding point residue is then output to the deformation combining unit 1050.

Specific processing will be described below. Corresponding point residue $E_L(i)$ (1≤i≤N) of each of the corresponding points in the second displacement field $\Phi_2^{-1}$ is calculated based on the following expression.

Expression 10

$$E_L(i) = \|x_{Ai} - \Phi_2^{-1}(x_{Bi})\| \qquad (10)$$

Here, $\Phi_2^{-1}(x)$ indicates a coordinate acquired by displacing the coordinates x in the second image toward the first image according to the second deformation $\Phi_2$. Therefore, the corresponding point residue $E_L(i)$ of each of the corresponding points represents the distance between each corresponding point coordinate $X_{A1}$ in the first image and the coordinate $\Phi_2^{-1}(x_{B1})$ acquired by converting each corresponding point coordinate $x_{B1}$ in the second image into a coordinate in the first image using the second displacement field $\Phi_2^{-1}$.

Step S7050: Combining First Deformation and Second Deformation Based on Distance from Corresponding Point and and Point Residue In step S7050 the deformation combining unit 1050 generates a combined displacement field $\Phi_{1+2}^{-1}$ acquired by combining a first displacement field $\Phi_1^{-1}$ and the second displacement field $\Phi_2^{-1}$ based on the distance from corresponding points obtained from a corresponding point obtaining unit 1020 and the corresponding point residue $E_L(i)$. The generated combined displacement field $\Phi_{1+2}^{-1}$ is then output to an image generation unit 1060.

Specific processing will be described below regarding differences from step S2050 of the first embodiment. In this embodiment, the magnitude of σ in a Gaussian function that corresponds to each corresponding point is changed according to the magnitude of the corresponding point residue $E_L(i)$ of the corresponding point in the second displacement field, and a combining ratio is calculated. At this time, the combining ratio is calculated as in the following expressions.

Expression 11

$$w_2(x) = \prod_{i=1}^{N} \{1 - g(x \mid x_{Bi}, \sigma(i)^2)\} \quad (11)$$

Expression 12

$$\sigma(i) = \alpha \cdot E_L(i) \quad (12)$$

Here, in place of Expression 4 of the first embodiment, $w_2(x)$ indicates a combining ratio at which the second displacement field is combined at the coordinates x in the second image, $\sigma(i)$ in Expression 11 is a variable that depends on the value of the corresponding point residue $E_L(i)$, and is proportional to the corresponding point residue $E_L(i)$ as in Expression 12. In Expression 11, $\alpha$ is a constant, and in this embodiment, $\alpha=5.0$ is applied, for example. Accordingly, when the corresponding point residue $E_L(i)$ is large, dispersion $\sigma(i)^2$ of the Gaussian function g is also large, and when the corresponding point residue $E_L(i)$ is small, the dispersion $\sigma(i)^2$ of the Gaussian function g is also small. Therefore, the spatial spread of the function of the combining ratio $w_2(x)$ in the periphery of each corresponding point differs according to the magnitude of the corresponding point residue $E_L(i)$. Specifically, in the periphery of corresponding points whose corresponding point residue $E_L(i)$ is large, the degree of the spatial spread of the combining ratio $w_2(x)$ is determined to be large, and in the periphery of corresponding points whose corresponding point residue $E_L(i)$ is small, the degree of the spatial spread of the combining ratio $w_2(x)$ is determined to be small. Processing of the image processing apparatus 1000 in this embodiment is performed in this manner.

As described above, according to this embodiment, the difference between two displacement fields is large in the periphery of corresponding points whose corresponding point residue is large, and thus the displacement fields are combined such that the ratio changes relatively smoothly in a broad range. On the other hand, the difference between two displacement fields is small in the periphery of corresponding points whose corresponding point residue is small, and thus the displacement fields are combined such that the ratio changes relatively steeply over a small range. This makes it possible to acquire a more natural deformation result.

Fourth Embodiment
Overview

In the first embodiment, first deformation and second deformation are combined at a ratio that is based on the distances from corresponding points. However, a reference according to which first deformation and second deformation are combined is not limited to the distances from corresponding points. In this embodiment, first deformation and second deformation are combined at a ratio that is based on the distances from the surface shape of the object in the image. Accordingly, in the case where the farther away a position is from the surface shape of the object, the lower the reliability of corresponding points obtained between images is, the following effect is acquired. By combining first deformation and second deformation such that the larger the distance from the surface shape of the object is, the larger the ratio of deformation that is based on a desired constraint condition is compared with the ratio of deformation for accurately matching corresponding points, it is possible to perform appropriate deformation registration that is based on the reliability of corresponding points. In addition, in the case where corresponding points are distributed mainly in the vicinity of the surface shape of the object, changing a combining ratio of two types of deformation according to distance from the object surface shape can provide an effect similar to an effect of changing a combining ratio according to the distances from corresponding points. Therefore, if only the distance from the surface shape at positions in the image is known, calculation can be performed based on an expression that is based on the distance from the surface shape, and is simpler than Expression 4 acquired by totaling radial basis functions on a plurality of corresponding points as In the first embodiment. Accordingly, a combined displacement field can be calculated, at a higher speed.

Configuration

Regarding an Image processing apparatus according to this embodiment, only differences from the first embodiment will be described below.

Figure 8:
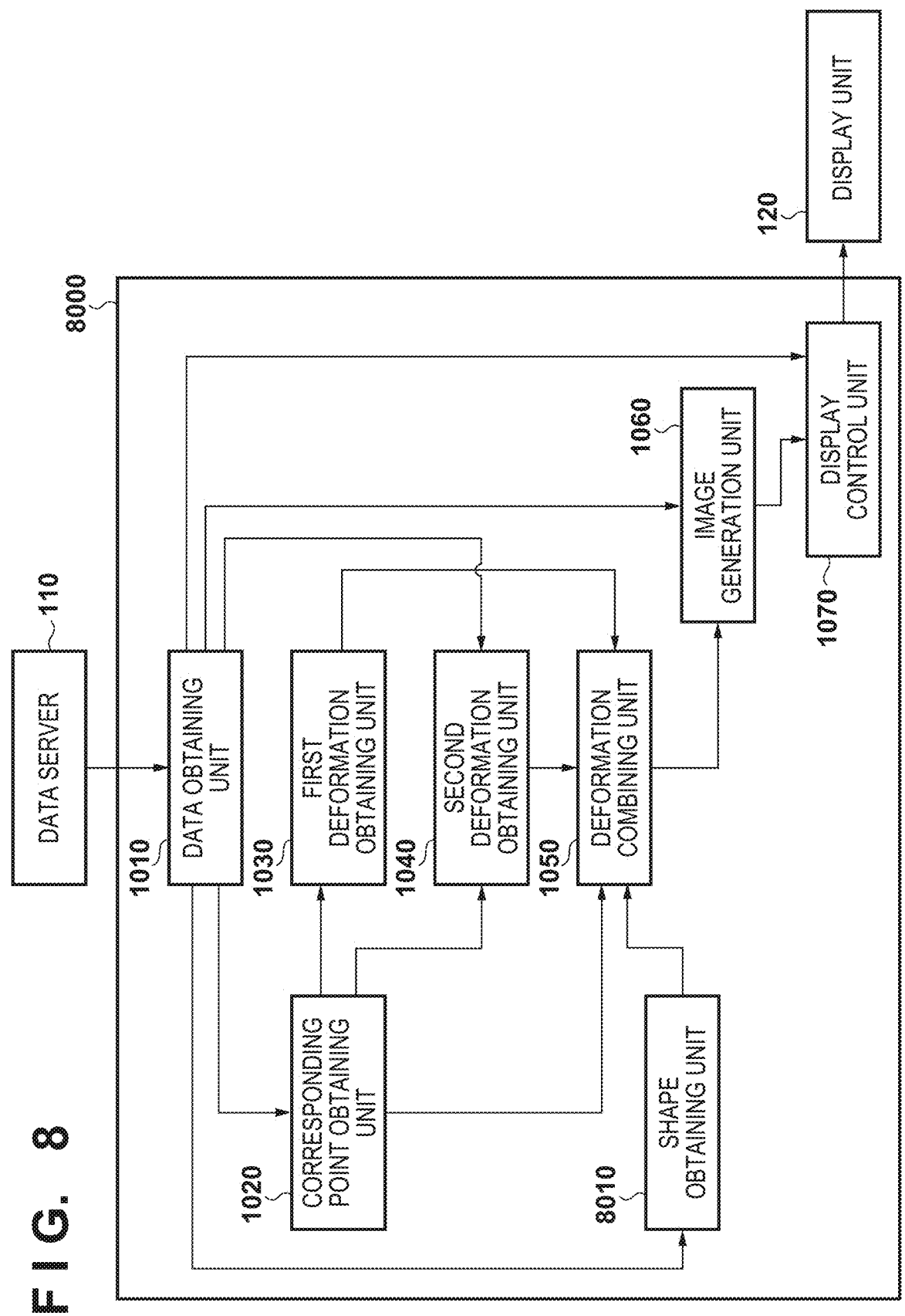
FIG. 8 is a diagram showing the device configuration of an image processing apparatus according to a fourth embodiment.

FIG. 8 is a diagram showing the configuration of an image processing apparatus 8000 according to this embodiment, and is similar to the image processing apparatus 1000 in the first embodiment, except that a shape obtaining unit 8010 is newly added. In addition, a deformation combining unit 1050 has a function different from that in the first embodiment, and thus the function will be described below. Other constituent elements have the same functions as those in the first embodiment, and thus a description regarding the same functions is omitted.

The shape obtaining unit 8010 extracts the surface shape of the object is from the image. The deformation combining unit 1050 generates a combined displacement field acquired by combining a first displacement field and a second displacement field at a ratio that is based on the distance from the surface shape of the object.

Processing

FIG. 9 is a flowchart showing an overall processing procedure that is performed by the image processing apparatus 8000 according to this embodiment. Note that, in FIG. 9, processing of steps S9010 to S9040 and processing of steps S9060 to S9070 are respectively the same as processing of steps S2010 to S2040 and processing of steps S2960 to S2070 in the flowchart in FIG. 2, and thus description thereof is omitted. Only differences from the flowchart in FIG. 2 will be described below.

Step S9045: Obtaining Surface Shape of Object

In step S9045, the shape obtaining unit 8010 extracts the surface shape of the object from an image. The data of the extracted surface shape of the object is then output to the deformation combining unit 1050. Specific processing will be described below. In this step, the shape obtaining unit 8010 extracts the surface shape of the object from a second image using a known shape extraction technique. In this embodiment, for example, the surface shape of the object is extracted using SNAKES that is a technique of a dynamic contour method. Note that a technique for extracting a surface shape is not limited thereto, and a technique for dividing a region by a threshold value of the luminance of an image, and any known technique such as a Region Growing method, a Level Set method, or a Graph Cut method may be used. In addition, without using an automatic extraction technique as described above, the surface shape may be manually extracted, by the user operating a UI (not illustrated).

Step S9050: Combining First and Second Deformation Based on Distance from Surface Shape In step S9050, the deformation combining unit 1050 combines a first displacement field $\Phi_1^{-1}$ and a second displacement field $\Phi_2^{-1}$ based on distances from corresponding points obtained from a corresponding point obtaining unit 1020 and the distance from the surface shape of the object obtained from the shape obtaining unit 8010. A generated combined displacement field $\Phi_{1+2}^{-1}$ is then output to the image generation unit 1060.

Regarding differences from step S2050 in the first embodiment, specific processing will be described below. In this step, a combining ratio is calculated based on the distance from the surface shape of the object in a second image, at each coordinate x in the second image. Specifically, the combining ratio is calculated using the following expressions.

Expression 13

$$w_1(x) = \frac{1}{1 + \beta \cdot d_{S2}(x)} \quad (13)$$

Expression 14

$$w_2(x) = 1 - w_1(x) \quad (14)$$

Here, $w_1(x)$ indicates a combining ratio at which a first displacement field is combined at the coordinate x in the second image, in place of Expression 5 in the first embodiment. $w_1(x)$ is a ratio ($0 \le w_1(x) \le 1$) that depends on the distance from the surface shape of the object in the second image, and when the distance between the surface shape of the object in the second image and the coordinate x is defined as $d_{S2}(x)$ as in Expression 13, is substantially inversely proportional to distance $d_{S2}(x)$. In addition, in Expression 13, $\beta$ is a constant, and in this embodiment $\beta=1.0$ is applied, for example, the combining ratio $w_1(x)$ takes value 1.0 when the coordinates x are positioned on the surface shape, in other words, the distance $d_{S2}(x)=0.0$, and is extremely close to being the value 0.0 when the distance from the surface shape approaches the infinite distance, in other words, the distance $d_{S2}(x)$ ~∞. Accordingly, the value of the combining ratio $W_1(x)$ decreases from 1.0 as the distance from the surface shape increases. Also, the value of $W_2(x)$ increases from 0.0 as the distance from the surface shape increases according to Expression 14. This provides an effect of decreasing the combining ratio of first deformation on corresponding points, and increasing the combining ratio of second deformation, as the distance from the surface shape of the object increases. As described above, a combining ratio can be calculated based on a single expression that is based on the distance from the surface shape as in Expressions 13 and 14, rather than Expressions 4 and 5 acquired by totaling radial basis functions on a plurality of corresponding points as in the first embodiment. Processing of the image processing apparatus 8000 in this embodiment is carried out in this manner.

By performing such processing, an effect can be provided in the following case. When the second image in this embodiment is a photoacoustic tomography image, for example, a photoacoustic signal that is generated when capturing an image attenuates from the surface shape of the object toward a deep portion of the body. Therefore, the luminance information of an anatomical structure that is extracted when being imaged tends to weaken farther away from the surface shape. Here, the second image 3020 in FIG. 4 represents a photoacoustic tomography image that is the second image in this embodiment. It can be seen that a corresponding point B2 in FIG. 4 is positioned near the surface shape, and thus a blood vessel image in the periphery of the corresponding point B2 is clearly shown, but a corresponding point B3 is farther from the surface shape than the point B2, and thus the blood vessel image in the periphery of the corresponding point B3 is shown as being slightly unclear. Therefore, when these corresponding points are obtained in step S9020, luminance that represents blood vessels decreases in the case of obtaining the corresponding points through automatic extraction, and thus there is a possibility that the extraction accuracy will decrease, and also in the ease of manual extraction, there is a possibility that the extraction accuracy will decrease due to poor visibility, in such a case, by applying processing in this embodiment, in a region close to the surface shape in which the reliability of the extraction accuracy of corresponding points is high, the corresponding points are accurately matched in the periphery of corresponding points. On the other hand, in a region distanced from the surface shape in which the reliability of the extraction accuracy is low, deformation is performed based on a desired constraint condition, in the periphery of corresponding points. This makes it possible to perform appropriate deformation registration.

Furthermore, a blood vessel structure that is shown in a photoacoustic tomography image includes, blood vessels (capillaries) that get thinner the closer they are to the surface of the body, and a larger number of vascular bifurcations that are feature points, and thus tends to include a large number of corresponding points. Furthermore, as described, above, a photoacoustic signal attenuates toward a deep portion of the body, and thus the number of blood vessel structures that are visualised tends to be smaller, and the number of corresponding points also tends to be smaller. Therefore, in a photoacoustic tomography image, corresponding points are distributed mainly in the vicinity of the surface shape of the object. Therefore, a similar effect to that of a method, for combining deformation in the first embodiment can be acquired, and a result can be obtained, at a higher speed than in the first embodiment.

As described above, according to this embodiment, if deformation that is based on a desired, constraint condition is superior to deformation for accurately matching corresponding points aa the distance from the surface shape of the object is larger, it is possible to perform appropriate deformation registration that is based on the reliability of the corresponding points. Furthermore, in the case where corresponding points are distributed mainly in the vicinity of the surface shape of the object, it is possible to acquire an effect similar to an effect of changing a combining ratio of two types of deformation according to the distance from corresponding points in the first embodiment, and a result can be obtained at a higher speed than in the first embodiment Deformation Example 4-1: Displacement fields May Be Combined Based on Distance from Surface Shape in First Image In the fourth embodiment, in step S9050, the first displacement field and the second displacement field are combined based on the distance from the surface shape of the object in the second image. However, the two displacement fields may be combined baaed on the distance from the surface shape of the object in the first linage. In this case, in step S9045, the shape obtaining unit 8010 extracts the surface shape of the object from the first image. Here, in order to calculate the distance from the surface shape In the first image, similar to Deformation Example 1-1 in the first embodiment, a combining ratio is calculated by referencing positions in the first image that correspond to the coordinates in the second image using the displacement field $\Phi^{-1}$. Accordingly, it is possible to calculate, via the displacement field $\Phi^{-1}$, a ratio that is based on the distance from the surface shape in the first image, at reference positions in the first image that correspond to the coordinates in the second image, as in the following expression.

Expression 15

$$w_1(x) = \frac{1}{1 + \beta \cdot d_{S2}(\Phi^{-1}(x))} \quad (15)$$

Here, $W_1(x)$ indicates a combining ratio at which the first displacement field Is combined at the coordinates x in the second image, in place of Expression 13 of the fourth embodiment. Only differences from Deformation Example 1-1 of the first embodiment will be described below. In Expression 15, $\Phi^{-1}(x)$ indicates a coordinate acquired by displacing the coordinate x in the second image toward the first image using the displacement field $\Phi^{-1}$. This method for calculating a displacement field is similar to Deformation Example 1-1 of the first embodiment, and thus a description thereof is omitted. In addition, $w_1(x)$ is a rate ($0 \leq W_1(x) \leq 1$) that depends on the distance from the surface shape of the object in the first image. When the distance between the surface shape of the object in the first image and the coordinate $\Phi^{-1}(x)$ in the first image is defined as $d_{S1}(\Phi^{-1}(x))$ as in Expression 15, $w_1(x)$ is inversely proportional to the distance $d_{S1}(\Phi^{-1}(x))$. Specific description is omitted, since it suffices that $d_{S2}(x)$ is replaced by $d_{S1}(\Phi^{-1}(x))$ in Expression 13, and the second image is replaced by the first image in the description.

Furthermore, displacement fields may be combined based on both the distance from the surface shape in the first image and the distance from the surface shape in the second image. In this case, in step S9045, the shape obtaining unit 8010 extracts the surface shape of the object from both the first image and second image. At this time, a combining ratio can be calculated using the following expression.

Expression 16

$$w_1(x) = a\frac{1}{1 + \beta \cdot d_{S1}(\Phi^{-1}(x))} + b\frac{1}{1 + \beta \cdot d_{S2}(x)} \quad (16)$$

Here, $w_1(x)$ indicates a combining ratio at which the first displacement field is combined at the coordinates x in the second image in place of Expression 13 in the fourth embodiment and Expression 15 above. Specific description is similar to that of Deformation Example 1-1 in the first embodiment, and is thus omitted.

As described above, according to this deformation example, by combining displacement fields based on the distance from the surface shape of the object in the first image, it is possible to obtain a combined displacement field in which the surface shape in the first Image is taken into consideration.

According to the present invention, it is possible to perform desired registration as a whole while accurately matching corresponding points between two pieces of image data.

Other Embodiments

Embodiment (s) of the present, invention can also be realized, by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system, or apparatus by, for example, reading out and executing the computer executable instructions from the storage medium to perform the functions of one or more of the above-described embodiment(s) and/or controlling the one or more circuits to perform the functions of one or more of the above-described embodiment (s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read, only memory (ROM), a storage of distributed computing systems, an optical, disk, (such as a compact disc (CD), digital versatile disc (DVD), or Elu-ray Disc (BD)™), a flash memory device, a memory card, and the like.

While the present invention has been described, with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-053140, filed Mar. 17, 2017, which is hereby incorporated, by reference wherein in its entirety.

What is claimed is:

1. An image processing apparatus comprising:
   a memory storing a program; and
   one or more processors which, by executing the program, function as:
   (1) a corresponding point obtaining unit configured to obtain corresponding points that are feature points of an object associated between a first image and a second image;
   (2) a first deformation obtaining unit configured to obtain a first displacement field related to a first deformation for matching the corresponding points between the first image and the second image, based on the corresponding points obtained by the corresponding point obtaining unit;
   (3) a second deformation obtaining unit configured to obtain a second displacement field related to a second deformation, wherein the second displacement field is based on (a) a matching term of luminance information between the first image and the second image and (b) a regularization term for imposing a penalty on deviation of deformation from a predetermined model, and wherein in the second displacement field, a degree of coincidence of corresponding points is lower than the first displacement field; and (4) a combining unit configured to generate a combined displacement field by combining the first displacement field and the second displacement field based on distances from the corresponding points, wherein a first evaluation function used in the first deformation is different from a second evaluation function used in the second deformation.

2. The image processing apparatus according to claim 1, wherein the combining unit combines the first displacement field and the second displacement field such that a combining ratio of the first displacement field is higher at a position closer to the corresponding points, and a combining ratio of the second displacement field is higher at a position farther from the corresponding points.

3. The image processing apparatus according to claim 1, wherein the combining unit sets reliability regarding a correspondence relationship for each corresponding point, and combines the first displacement field and the second displacement field based on a combining ratio that is based on the reliability of the corresponding point.

4. The image processing apparatus according to claim 1, wherein the combining unit (a) selects, from among the corresponding points, a corresponding point that is in the vicinity of each position of a plurality of positions in at least one of the first image and the second image and (b) combines the first displacement field and the second displacement field using a combining ratio calculated based on a distance between the selected corresponding point and the position.

5. The image processing apparatus according to claim 1, wherein the corresponding point obtaining unit obtains a plurality of corresponding points, and wherein the combining unit combines the first displacement field and the second displacement field, regarding each position of a plurality of positions in at least one of the first image and the second image, using a combining ratio function acquired by totaling radial basis functions that respectively correspond to the plurality of corresponding points, and are based on distances from the corresponding points.

6. The image processing apparatus according to claim 5, wherein the radial basis functions take a minimum value 0 on the corresponding points, and a maximum value of the radial basis functions is 1.

7. The image processing apparatus according to claim 5, wherein the combining ratio function is a function acquired by totaling the radial basis functions that respectively correspond to the plurality of corresponding points, through multiplication.

8. The image processing apparatus according to claim 5, wherein the combining ratio function is a function acquired by totaling the radial basis functions that respectively correspond to the plurality of corresponding points, through addition.

9. The image processing apparatus according to claim 5, wherein the one or more processors, by executing the program, further function as:

a corresponding point residue obtaining unit configured to obtain corresponding point residue that represents positional shift between corresponding points in the second deformation, wherein the combining unit determines a degree of spatial spread of the radial basis functions based on the corresponding point residue.

10. The image processing apparatus according to claim 1, wherein the one or more processors, by executing the program, further function as:

an image generation unit configured to generate a deformed image acquired by deforming the first image based on the combined displacement field.

11. The image processing apparatus according to claim 10, wherein the image generation unit further generates a difference image between the second image and the deformed image.

12. The image processing apparatus according to claim 1, wherein the second evaluation function includes the matching term and the regularization term.

13. An image processing apparatus comprising:
a memory storing a program; and
one or more processors which, by executing the program, function as:

(1) a corresponding point obtaining unit configured to obtain corresponding points that are feature points of an object associated between a first image and a second image;

(2) a first deformation obtaining unit configured to obtain a first displacement field related to a first deformation for matching the corresponding points between the first image and the second image, based on the corresponding points obtained by the corresponding point obtaining unit;

(3) a second deformation obtaining unit configured to obtain a second displacement field relating to a second deformation, wherein the second displacement field is based on (a) a matching term of luminance information between the first image and the second image and (b) a regularization term for imposing a penalty on deviation of deformation from a predetermined model, and wherein in the second displacement field, a degree of coincidence of corresponding points is lower than the first displacement field;

(4) a shape obtaining unit configured to obtain a surface shape of the object in at least one image of the first image and the second image; and (5) a combining unit configured to generate a combined displacement field by combining the first displacement field and the second displacement field based on a distance from the surface shape, wherein a first evaluation function used in the first deformation is different from a second evaluation function used in the second deformation.

14. The image processing apparatus according to claim 13, wherein the second evaluation function includes the matching term and the regularization term.

15. The image processing apparatus according to claim 13, wherein the combining unit combines the first displacement field and the second displacement field so that a ratio of the second deformation is larger than a ratio of the first deformation as the distance from the surface shape of the object increases.

16. A control method of an image processing apparatus, the method comprising:

obtaining corresponding points that are feature points of an object associated between a first image and a second image;

obtaining a first displacement field related to a first deformation for matching the corresponding points between the first image and the second image, based on the corresponding points;

obtaining a second displacement field related to a second deformation, wherein the second displacement field is based on (a) a matching term of luminance information between the first image and the second image and (b) a regularization term for imposing a penalty on deviation of deformation from a predetermined model, and wherein in the second displacement field, a degree of coincidence of corresponding points is lower than the first displacement field; and generating a combined displacement field by combining the first displacement field and the second displacement field based on distances from the corresponding points, wherein a first evaluation function used in the first deformation is different from a second evaluation function used in the second deformation.

17. A control method of an image processing apparatus, the method comprising:

obtaining corresponding points that are feature points of an object associated between a first image and a second image;

obtaining a first displacement field related to a first deformation for matching the corresponding points between the first image and the second image, based on the corresponding points;

obtaining a second displacement field relating to a second deformation, wherein the second displacement field is based on (a) a matching term of luminance information between the first image and the second image and (b) a regularization term for imposing a penalty on deviation of deformation from a predetermined model, and wherein in the second displacement field, a degree of coincidence of corresponding points is lower than the first displacement field;

obtaining a surface shape of the object in at least one image of the first image and the second image; and generating a combined displacement field by combining the first displacement field and the second displacement field based on a distance from the surface shape, wherein a first evaluation function used in the first deformation is different from a second evaluation function used in the second deformation.

18. A non-transitory computer-readable storage medium storing a computer program for causing a computer to perform steps of a control method of an image processing apparatus, the method comprising:

obtaining corresponding points that are feature points of an object associated between a first image and a second image;

obtaining a first displacement field related to a first deformation for matching the corresponding points between the first image and the second image, based on the corresponding points;

obtaining a second displacement field related to a second deformation, wherein the second displacement field based on (a) a matching term of luminance information between the first image and the second image and (b) a regularization term for imposing a penalty on deviation of deformation from a predetermined model, and wherein in the second displacement field, a degree of coincidence of corresponding points is lower than the first displacement field; and generating a combined displacement field by combining the first displacement field and the second displacement field based on distances from the corresponding points, wherein a first evaluation function used in the first deformation is different from a second evaluation function used in the second deformation.

19. A non-transitory computer-readable storage medium storing a computer program for causing a computer to perform steps of a control method of an image processing apparatus, the method comprising:

obtaining corresponding points that are feature points of an object associated between a first image and a second image;

obtaining a first displacement field related to a first deformation for matching the corresponding points between the first image and the second image, based on the corresponding points;

obtaining a second displacement field relating to a second deformation, wherein the second displacement field is based on (a) a matching term of luminance information between the first image and the second image and (b) a regularization term for imposing a penalty on deviation of deformation from a predetermined model, and wherein in the second displacement field, a degree of coincidence of corresponding points is lower than the first displacement field;

obtaining a surface shape of the object in at least one image of the first image and the second image; and generating a combined displacement field by combining the first displacement field and the second displacement field based on a distance from the surface shape, wherein a first evaluation function used in the first deformation is different from a second evaluation function used in the second deformation.

20. An image processing apparatus comprising:
a memory storing a program; and
one or more processors which, by executing the program, function as:

(1) a corresponding point obtaining unit configured to obtain corresponding points that are feature points of an object associated between a first image and a second image;

(2) a first deformation obtaining unit configured to obtain a first displacement field for matching the corresponding points between the first image and the second image, based on the corresponding points obtained by the corresponding point obtaining unit;

(3) a second deformation obtaining unit configured to obtain a second displacement field that is performed between the first image and the second image based on a predetermined constraint condition, and in which a degree of coincidence of corresponding points is lower than the first displacement field; and (4) a combining unit configured to combine the first displacement field and the second displacement field for each position on at least one of the first image and the second image, using a combining ratio function acquired by combining radial basis functions that respectively correspond to the plurality of corresponding points, and are based on distances from the corresponding points.

21. The image processing apparatus according to claim 20, wherein the combining unit combines the first displacement field and the second displacement field so that a composition rate of the first deformation is higher as a distance from the corresponding point closest to the position is closer, and a composition rate of the second deformation is higher as the distance from the corresponding point closest to the position is farther.

22. The image processing apparatus according to claim 20, wherein the combining ratio function is calculated based on the distance from the corresponding points of K-nearest neighbors in each coordinate in the second image.

* * * * *